US010621828B2

(12) United States Patent
Cire et al.

(10) Patent No.: US 10,621,828 B2
(45) Date of Patent: Apr. 14, 2020

(54) VARIABLE SKILL OBJECTIVE WAGERING SYSTEM

(71) Applicant: Gamblit Gaming, LLC, Glendale, CA (US)

(72) Inventors: Bryce Cire, Los Angeles, CA (US); Frank Cire, Pasadena, CA (US); Eric Meyerhofer, Pasadena, CA (US); Ivan Souffront, Sunland, CA (US); Darion Lowenstein, Los Angeles, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

(21) Appl. No.: 15/597,123

(22) Filed: May 16, 2017

(65) Prior Publication Data

US 2017/0330421 A1 Nov. 16, 2017

Related U.S. Application Data

(60) Provisional application No. 62/337,265, filed on May 16, 2016.

(51) Int. Cl.
*G06F 17/00* (2019.01)
*G07F 17/32* (2006.01)

(52) U.S. Cl.
CPC ...... *G07F 17/3267* (2013.01); *G07F 17/3209* (2013.01); *G07F 17/3251* (2013.01); *G07F 17/3288* (2013.01); *G07F 17/3295* (2013.01)

(58) Field of Classification Search
None
See application file for complete search history.

(56) References Cited

U.S. PATENT DOCUMENTS 5,413,357 A 5/1995 Schulze et al.
5,718,429 A 2/1998 Keller
5,785,592 A 7/1998 Jacobsen
5,853,324 A 12/1998 Kami et al.
5,963,745 A 10/1999 Collins et al.
6,050,895 A 4/2000 Luciano
(Continued)

OTHER PUBLICATIONS

U.S. Appl. No. 14/815,764 Arnone, et al. filed Jul. 31, 2015.
(Continued)

*Primary Examiner* — Paul A D'Agostino
(74) *Attorney, Agent, or Firm* — Frank Cire

(57) ABSTRACT

A variable skill objective wagering system is disclosed. The variable skill objective wagering system includes an interactive controller that receives a skill proposition for a skill-based game from a process controller, generates a player presentation based on the skill proposition, detects player interactions of a player with the player presentation, determines a skill outcome based on the player interactions and the skill proposition, and communicates the skill outcome to the process controller. The process controller operatively connected to the interactive controller, wherein the process controller is constructed to generate a random outcome using a random number generator, determine a skill objective of the skill proposition based on the random outcome, communicate the skill proposition to the interactive controller; and receive a skill outcome for the skill proposition from the interactive controller.

8 Claims, 13 Drawing Sheets

(56) References Cited

U.S. PATENT DOCUMENTS

| | | | |
|---|---|---|---|
| 6,165,071 A | 12/2000 | Weiss | |
| 6,227,974 B1 | 5/2001 | Eilat | |
| 6,267,669 B1 * | 7/2001 | Luciano, Jr. ............ | A63F 13/10 273/269 |
| 6,685,563 B1 | 2/2004 | Meekins et al. | |
| 6,712,693 B1 | 3/2004 | Hettinger | |
| 6,761,632 B2 | 7/2004 | Bansemer et al. | |
| 6,761,633 B2 | 7/2004 | Riendeau | |
| 6,764,397 B1 | 7/2004 | Robb | |
| 6,811,482 B2 | 11/2004 | Letovsky | |
| 7,118,105 B2 | 10/2006 | Benevento | |
| 7,294,058 B1 | 11/2007 | Slomiany | |
| 7,326,115 B2 | 2/2008 | Baerlocher | |
| 7,361,091 B2 | 4/2008 | Letovsky | |
| 7,517,282 B1 | 4/2009 | Pryor | |
| 7,575,517 B2 | 8/2009 | Parham et al. | |
| 7,682,239 B2 | 3/2010 | Friedman et al. | |
| 7,720,733 B2 | 5/2010 | Jung | |
| 7,753,770 B2 | 7/2010 | Walker et al. | |
| 7,753,790 B2 | 7/2010 | Nguyen | |
| 7,766,742 B2 | 8/2010 | Bennett et al. | |
| 7,775,885 B2 | 8/2010 | Van Luchene | |
| 7,798,896 B2 | 9/2010 | Katz | |
| 7,828,657 B2 | 11/2010 | Booth | |
| 7,917,371 B2 | 3/2011 | Jung et al. | |
| 7,931,531 B2 | 4/2011 | Oberberger | |
| 7,938,727 B1 | 5/2011 | Konkle | |
| 7,950,993 B2 | 5/2011 | Oberberger | |
| 7,967,674 B2 | 6/2011 | Baerlocher | |
| 7,980,948 B2 | 7/2011 | Rowe | |
| 7,996,264 B2 | 8/2011 | Kusumoto et al. | |
| 8,012,023 B2 | 9/2011 | Gates | |
| 8,047,908 B2 | 11/2011 | Walker | |
| 8,047,915 B2 | 11/2011 | Lyle | |
| 8,060,829 B2 | 11/2011 | Jung et al. | |
| 8,075,383 B2 | 12/2011 | Friedman et al. | |
| 8,087,999 B2 | 1/2012 | Oberberger | |
| 8,113,938 B2 | 2/2012 | Friedman et al. | |
| 8,118,654 B1 | 2/2012 | Nicolas | |
| 8,128,487 B2 | 3/2012 | Hamilton et al. | |
| 8,135,648 B2 | 3/2012 | Oram | |
| 8,137,193 B1 | 3/2012 | Kelly et al. | |
| 8,142,272 B2 | 3/2012 | Walker | |
| 8,157,653 B2 | 4/2012 | Buhr | |
| 8,167,699 B2 | 5/2012 | Inamura | |
| 8,177,628 B2 | 5/2012 | Manning | |
| 8,182,338 B2 | 5/2012 | Thomas | |
| 8,182,339 B2 | 5/2012 | Anderson | |
| 8,187,068 B2 | 5/2012 | Slomiany | |
| 8,206,210 B2 | 6/2012 | Walker | |
| 8,308,544 B2 | 11/2012 | Friedman | |
| 8,430,735 B2 | 4/2013 | Oberberger | |
| 8,475,266 B2 | 7/2013 | Arnone | |
| 8,480,470 B2 | 7/2013 | Napolitano et al. | |
| 8,622,809 B1 | 1/2014 | Arora et al. | |
| 8,864,564 B2 | 10/2014 | Oberberger | |
| 9,070,257 B1 | 6/2015 | Scalise | |
| 2001/0004609 A1 | 6/2001 | Walker et al. | |
| 2001/0019965 A1 | 9/2001 | Ochi | |
| 2002/0022509 A1 | 2/2002 | Nicastro et al. | |
| 2002/0090990 A1 | 7/2002 | Joshi et al. | |
| 2002/0175471 A1 | 11/2002 | Faith | |
| 2003/0060286 A1 | 3/2003 | Walker et al. | |
| 2003/0109301 A1 | 6/2003 | Chudley | |
| 2003/0119576 A1 | 6/2003 | McClintic et al. | |
| 2003/0139214 A1 | 7/2003 | Wolf et al. | |
| 2003/0171149 A1 | 9/2003 | Rothschild | |
| 2003/0204565 A1 | 10/2003 | Guo et al. | |
| 2003/0211879 A1 | 11/2003 | Englman | |
| 2004/0092313 A1 | 5/2004 | Saito et al. | |
| 2004/0097610 A1 | 5/2004 | Saito | |
| 2004/0102238 A1 | 5/2004 | Taylor | |
| 2004/0121839 A1 | 6/2004 | Webb | |
| 2004/0225387 A1 | 11/2004 | Smith | |
| 2005/0003878 A1 | 1/2005 | Updike | |
| 2005/0096124 A1 | 5/2005 | Stronach | |
| 2005/0116411 A1 | 6/2005 | Herrmann et al. | |
| 2005/0192087 A1 | 9/2005 | Friedman et al. | |
| 2005/0233791 A1 | 10/2005 | Kane | |
| 2005/0233806 A1 | 10/2005 | Kane et al. | |
| 2005/0239538 A1 | 10/2005 | Dixon | |
| 2005/0269778 A1 | 12/2005 | Samberg | |
| 2005/0288101 A1 | 12/2005 | Lockton et al. | |
| 2006/0003823 A1 | 1/2006 | Zhang | |
| 2006/0003830 A1 | 1/2006 | Walker et al. | |
| 2006/0035696 A1 | 2/2006 | Walker | |
| 2006/0040735 A1 | 2/2006 | Baerlocher | |
| 2006/0068913 A1 | 3/2006 | Walker et al. | |
| 2006/0084499 A1 | 4/2006 | Moshal | |
| 2006/0084505 A1 | 4/2006 | Yoseloff | |
| 2006/0135250 A1 | 6/2006 | Rossides | |
| 2006/0154710 A1 | 7/2006 | Serafat | |
| 2006/0166729 A1 | 7/2006 | Saffari et al. | |
| 2006/0189371 A1 | 8/2006 | Walker et al. | |
| 2006/0223611 A1 | 10/2006 | Baerlocher | |
| 2006/0234791 A1 | 10/2006 | Nguyen et al. | |
| 2006/0240890 A1 | 10/2006 | Walker | |
| 2006/0246403 A1 | 11/2006 | Monpouet et al. | |
| 2006/0258433 A1 | 11/2006 | Finocchio et al. | |
| 2007/0026924 A1 | 2/2007 | Taylor | |
| 2007/0035548 A1 | 2/2007 | Jung et al. | |
| 2007/0038559 A1 | 2/2007 | Jung et al. | |
| 2007/0064074 A1 | 3/2007 | Silverbrook et al. | |
| 2007/0066403 A1 * | 3/2007 | Conkwright ............ | A63F 13/10 463/43 |
| 2007/0087799 A1 | 4/2007 | Van Luchene | |
| 2007/0093299 A1 | 4/2007 | Bergeron | |
| 2007/0099696 A1 | 5/2007 | Nguyen et al. | |
| 2007/0117641 A1 | 5/2007 | Walker et al. | |
| 2007/0129149 A1 | 6/2007 | Walker | |
| 2007/0142108 A1 | 6/2007 | Linard | |
| 2007/0156509 A1 | 7/2007 | Jung et al. | |
| 2007/0167212 A1 | 7/2007 | Nguyen | |
| 2007/0167239 A1 | 7/2007 | O'Rourke | |
| 2007/0173311 A1 | 7/2007 | Morrow et al. | |
| 2007/0191104 A1 | 8/2007 | Van Luchene | |
| 2007/0202941 A1 | 8/2007 | Miltenberger | |
| 2007/0203828 A1 | 8/2007 | Jung et al. | |
| 2007/0207847 A1 | 9/2007 | Thomas | |
| 2007/0259717 A1 | 11/2007 | Mattice | |
| 2007/0293306 A1 | 12/2007 | Nee et al. | |
| 2008/0004107 A1 | 1/2008 | Nguyen et al. | |
| 2008/0014835 A1 | 1/2008 | Weston et al. | |
| 2008/0015004 A1 | 1/2008 | Gatto et al. | |
| 2008/0064488 A1 | 3/2008 | Oh | |
| 2008/0070659 A1 | 3/2008 | Naicker | |
| 2008/0070690 A1 | 3/2008 | Van Luchene | |
| 2008/0070702 A1 | 3/2008 | Kaminkow | |
| 2008/0096665 A1 | 4/2008 | Cohen | |
| 2008/0108406 A1 | 5/2008 | Oberberger | |
| 2008/0108425 A1 | 5/2008 | Oberberger | |
| 2008/0113704 A1 | 5/2008 | Jackson | |
| 2008/0119283 A1 | 5/2008 | Baerlocher | |
| 2008/0146308 A1 | 6/2008 | Okada | |
| 2008/0161081 A1 | 7/2008 | Berman | |
| 2008/0176619 A1 | 7/2008 | Kelly | |
| 2008/0191418 A1 | 8/2008 | Lutnick et al. | |
| 2008/0195481 A1 | 8/2008 | Lutnick | |
| 2008/0248850 A1 | 10/2008 | Schugar | |
| 2008/0254893 A1 | 10/2008 | Patel | |
| 2008/0274796 A1 | 11/2008 | Lube | |
| 2008/0274798 A1 | 11/2008 | Walker et al. | |
| 2008/0311980 A1 | 12/2008 | Cannon | |
| 2008/0318668 A1 | 12/2008 | Ching | |
| 2009/0011827 A1 | 1/2009 | Englman | |
| 2009/0023489 A1 | 1/2009 | Toneguzzo | |
| 2009/0023492 A1 | 1/2009 | Erfanian | |
| 2009/0061974 A1 | 3/2009 | Lutnick et al. | |
| 2009/0061975 A1 | 3/2009 | Ditchev | |
| 2009/0061991 A1 | 3/2009 | Popovich | |
| 2009/0061997 A1 | 3/2009 | Popovich | |
| 2009/0061998 A1 | 3/2009 | Popovich | |
| 2009/0061999 A1 | 3/2009 | Popovich | |
| 2009/0082093 A1 | 3/2009 | Okada | |

(56) References Cited

U.S. PATENT DOCUMENTS

2009/0088239 A1 4/2009 Iddings
2009/0098934 A1 4/2009 Amour
2009/0118006 A1 5/2009 Kelly et al.
2009/0124344 A1 5/2009 Mitchell et al.
2009/0131158 A1 5/2009 Brunet De Courssou et al.
2009/0131175 A1 5/2009 Kelly et al.
2009/0143141 A1 6/2009 Wells
2009/0149233 A1 6/2009 Strause et al.
2009/0156297 A1 6/2009 Andersson et al.
2009/0176560 A1 7/2009 Herrmann et al.
2009/0176566 A1 7/2009 Kelly
2009/0181777 A1 7/2009 Christiani
2009/0221355 A1 9/2009 Dunaevsky et al.
2009/0239610 A1 9/2009 Olive
2009/0247272 A1 10/2009 Abe
2009/0270164 A1 10/2009 Seelig
2009/0275393 A1 11/2009 Kisenwether
2009/0291755 A1 11/2009 Walker et al.
2009/0309305 A1 12/2009 May
2009/0312093 A1 12/2009 Walker et al.
2009/0325686 A1 12/2009 Davis
2010/0004058 A1 1/2010 Acres
2010/0016056 A1 1/2010 Thomas et al.
2010/0029373 A1 2/2010 Graham et al.
2010/0035674 A1 2/2010 Slomiany
2010/0056247 A1 3/2010 Nicely
2010/0056260 A1 3/2010 Fujimoto
2010/0062836 A1 3/2010 Young
2010/0093420 A1 4/2010 Wright
2010/0093444 A1 4/2010 Biggar et al.
2010/0105454 A1 4/2010 Weber
2010/0120502 A1 5/2010 Oberberger
2010/0120525 A1 5/2010 Baerlocher et al.
2010/0124983 A1 5/2010 Gowin et al.
2010/0137047 A1 6/2010 Englman et al.
2010/0174593 A1 7/2010 Cao
2010/0184509 A1 7/2010 Sylla et al.
2010/0203940 A1 8/2010 Alderucci et al.
2010/0210344 A1 8/2010 Edidin et al.
2010/0227672 A1 9/2010 Amour
2010/0227688 A1 9/2010 Lee
2010/0240436 A1 9/2010 Wilson et al.
2010/0285869 A1 11/2010 Walker
2010/0304825 A1 12/2010 Davis
2010/0304839 A1 12/2010 Johnson
2010/0304842 A1 12/2010 Friedman et al.
2011/0009177 A1 1/2011 Katz
2011/0009178 A1 1/2011 Gerson
2011/0045896 A1 2/2011 Sak et al.
2011/0070945 A1 3/2011 Walker
2011/0077087 A1 3/2011 Walker et al.
2011/0082571 A1 4/2011 Murdock et al.
2011/0105206 A1 5/2011 Rowe et al.
2011/0107239 A1 5/2011 Adoni
2011/0109454 A1 5/2011 McSheffrey
2011/0111820 A1 5/2011 Filipour
2011/0111837 A1 5/2011 Gagner
2011/0111841 A1 5/2011 Tessmer
2011/0118011 A1 5/2011 Filipour et al.
2011/0201413 A1 8/2011 Oberberger
2011/0207523 A1 8/2011 Filipour et al.
2011/0212766 A1 9/2011 Bowers
2011/0212767 A1 9/2011 Barclay
2011/0218028 A1 9/2011 Acres
2011/0218035 A1 9/2011 Thomas
2011/0230258 A1 9/2011 Van Luchene
2011/0230260 A1 9/2011 Morrow et al.
2011/0230267 A1 9/2011 Van Luchene
2011/0244944 A1 10/2011 Baerlocher
2011/0263312 A1 10/2011 De Waal
2011/0269522 A1 11/2011 Nicely et al.
2011/0275440 A1 11/2011 Faktor
2011/0287828 A1 11/2011 Anderson et al.
2011/0287841 A1 11/2011 Watanabe
2011/0312408 A1 12/2011 Okuaki
2011/0319169 A1 12/2011 Lam
2012/0004747 A1 1/2012 Kelly
2012/0028718 A1 2/2012 Barclay et al.
2012/0058814 A1 3/2012 Lutnick
2012/0077569 A1 3/2012 Watkins
2012/0108323 A1 5/2012 Kelly
2012/0135793 A1 5/2012 Antonopoulos
2012/0202587 A1 8/2012 Allen
2012/0302311 A1 11/2012 Luciano
2012/0322545 A1 12/2012 Arnone et al.
2013/0029760 A1 1/2013 Wickett
2013/0131848 A1 5/2013 Arnone et al.
2013/0190074 A1 7/2013 Arnone et al.
2013/0260869 A1 10/2013 Leandro et al.
2014/0087801 A1 3/2014 Nicely et al.
2014/0087808 A1 3/2014 Leandro et al.
2014/0087809 A1 3/2014 Leupp et al.
2014/0295925 A1 10/2014 Gladwell
2014/0357350 A1 12/2014 Weingardt et al.
2015/0287264 A1* 10/2015 De Viveiros Ortiz ........................ G07F 17/3244 463/25
2016/0343211 A1 11/2016 Graboyes Goldman
2017/0084129 A1 3/2017 Baerlocher

OTHER PUBLICATIONS

U.S. Appl. No. 14/815,774 Arnone, et al. filed Jul. 31, 2015.
U.S. Appl. No. 14/817,032 Arnone, et al. filed Aug. 3, 2015..
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.

(56) References Cited

OTHER PUBLICATIONS

U.S. Appl. No. 15/057,095 Arnone, et al. filed Feb. 29, 2016.
U.S. Appl. No. 15/060,502 Arnone, et al. filed Mar. 3, 2016.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/134,852 Arnone, et al. filed Apr. 21, 2016.
U.S. Appl. No. 15/139,148 Arnone, et al. filed Apr. 26, 2016.
U.S. Appl. No. 15/141,784 Arnone, et al. filed Apr. 29, 2016.
U.S. Appl. No. 15/155,107 Arnone, et al. filed May 16, 2016.
U.S. Appl. No. 15/156,222 Arnone, et al. filed May 16, 2016.
U.S. Appl. No. 15/158,530 Arnone, et al. filed May 18, 2016.
U.S. Appl. No. 15/161,174 Arnone, et al. filed May 20, 2016.
U.S. Appl. No. 15/170,773 Arnone, et al. filed Jun. 1, 2016.
U.S. Appl. No. 15/174,995 Arnone, et al. filed Jun. 6, 2016.
U.S. Appl. No. 15/179,940 Arnone, et al. filed Jun. 10, 2016.
U.S. Appl. No. 15/189,797 Arnone, et al. filed Jun. 22, 2016.
U.S. Appl. No. 15/190,745 Arnone, et al. filed Jun. 23, 2016.
U.S. Appl. No. 15/191,050 Arnone, et al. filed Jun. 23, 2016.
U.S. Appl. No. 15/219,257 Arnone, et al. filed Jul. 25, 2016.
U.S. Appl. No. 15/227,881 Arnone, et al. filed Aug. 3, 2016.
U.S. Appl. No. 15/241,683 Arnone, et al. filed Aug. 19, 2016.
U.S. Appl. No. 15/245,040 Arnone, et al. filed Aug. 23, 2016.
U.S. Appl. No. 15/233,294 Arnone, et al. filed Aug. 24, 2016.
U.S. Appl. No. 15/252,190 Arnone, et al. filed Aug. 30, 2016.
U.S. Appl. No. 15/255,789 Arnone, et al. filed Sep. 2, 2016.
U.S. Appl. No. 15/261,858 Arnone, et al. filed Sep. 9, 2016.
U.S. Appl. No. 15/264,521 Arnone, et al. filed Sep. 13, 2016.
U.S. Appl. No. 15/264,557 Arnone, et al. filed Sep. 13, 2016.
U.S. Appl. No. 15/271,214 Arnone, et al. filed Sep. 20, 2016.
U.S. Appl. No. 15/272,318 Arnone, et al. filed Sep. 21, 2016.
U.S. Appl. No. 15/273,260 Arnone, et al. filed Sep. 22, 2016.
U.S. Appl. No. 15/276,469 Arnone, et al. filed Sep. 26, 2016.
U.S. Appl. No. 15/280,255 Arnone, et al. filed Sep. 29, 2016.
U.S. Appl. No. 15/286,922 Arnone, et al. filed Oct. 6, 2016.
U.S. Appl. No. 15/287,129 Arnone, et al. filed Oct. 6, 2016.
U.S. Appl. No. 15/289,648 Arnone, et al. filed Oct. 10, 2016.
U.S. Appl. No. 15/297,019 Arnone, et al. filed Oct. 18, 2016.
U.S. Appl. No. 15/298,533 Arnone, et al. filed Oct. 20, 2016.
U.S. Appl. No. 15/336,696 Arnone, et al. filed Oct. 27, 2016.
U.S. Appl. No. 15/339,898 Arnone, et al. filed Oct. 31, 2016.
U.S. Appl. No. 15/345,451 Arnone, et al. filed Nov. 7, 2016.
U.S. Appl. No. 15/362,214 Arnone, et al. filed Nov. 28, 2016.
U.S. Appl. No. 15/362,660 Arnone, et al. filed Nov. 28, 2016.
U.S. Appl. No. 15/365,628 Arnone, et al. filed Nov. 30, 2016.
U.S. Appl. No. 15/367,541 Arnone, et al. filed Dec. 2, 2016.
U.S. Appl. No. 15/369,394 Arnone, et al. filed Dec. 5, 2016.
U.S. Appl. No. 15/370,425 Arnone, et al. filed Dec. 6, 2016.
U.S. Appl. No. 15/375,711 Arnone, et al. filed Dec. 12, 2016.
U.S. Appl. No. 15/387,117 Arnone, et al. filed Dec. 21, 2016.
U.S. Appl. No. 15/392,887 Arnone, et al. filed Dec. 28, 2016.
U.S. Appl. No. 15/393,212 Arnone, et al. filed Dec. 28, 2016.
U.S. Appl. No. 15/394,257 Arnone, et al. filed Dec. 29, 2016.
U.S. Appl. No. 15/396,352 Arnone, et al. filed Dec. 30, 2016.
U.S. Appl. No. 15/396,354 Arnone, et al. filed Dec. 30, 2016.
U.S. Appl. No. 15/396,365 Arnone, et al. filed Dec. 30, 2016.
U.S. Appl. No. 15/406,474 Arnone, et al. filed Jan. 13, 2017.
U.S. Appl. No. 15/413,322 Arnone, et al. filed Jan. 23, 2017.
U.S. Appl. No. 15/415,833 Arnone, et al. filed Jan. 25, 2017.
U.S. Appl. No. 15/417,030 Arnone, et al. filed Jan. 26, 2017.
U.S. Appl. No. 15/422,453 Arnone, et al. filed Feb. 1, 2017.
U.S. Appl. No. 15/431,631 Arnone, et al. filed Feb. 13, 2017.
U.S. Appl. No. 15/434,843 Arnone, et al. filed Feb. 16, 2017.
U.S. Appl. No. 15/439,499 Arnone, et al. filed Feb. 22, 2017.
U.S. Appl. No. 15/449,249 Arnone, et al. filed Mar. 3, 2017.
U.S. Appl. No. 15/449,256 Arnone, et al. filed Mar. 3, 2017.
U.S. Appl. No. 15/450,287 Arnone, et al. filed Mar. 6, 2017.
U.S. Appl. No. 15/456,079 Arnone, et al. filed Mar. 10, 2017.
U.S. Appl. No. 15/457,827 Arnone, et al. filed Mar. 13, 2017.
U.S. Appl. No. 15/458,490 Arnone, et al. filed Mar. 14, 2017.
U.S. Appl. No. 15/460,195 Arnone, et al. filed Mar. 15, 2017.
U.S. Appl. No. 15/463,725 Arnone, et al. filed Mar. 20, 2017.
U.S. Appl. No. 15/464,282 Arnone, et al. filed Mar. 20, 2017.
U.S. Appl. No. 15/465,521 Arnone, et al. filed Mar. 21, 2017.
U.S. Appl. No. 15/470,869 Arnone, et al. filed Mar. 27, 2017.
U.S. Appl. No. 15/473,523 Arnone, et al. filed Mar. 29, 2017.
U.S. Appl. No. 15/483,773 Arnone, et al. filed Apr. 10, 2017.
U.S. Appl. No. 15/489,343 Arnone, et al. filed Apr. 17, 2017.
U.S. Appl. No. 15/491,617 Arnone, et al. filed Apr. 19, 2017.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.

(56) References Cited

OTHER PUBLICATIONS

U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
Non-Final Office Action in U.S. Appl. No. 15/715,107, dated Jun. 25, 2019.

* cited by examiner

VARIABLE SKILL OBJECTIVE WAGERING SYSTEM

CROSS REFERENCE TO RELATED APPLICATION

This application claims the benefit of U.S. Provisional Application No. 62/337,265, filed May 16, 2016, the contents of which are incorporated by reference herein in their entirety.

FIELD OF THE INVENTION

Embodiments of the invention are generally related to communications within data processing systems. More particularly, embodiments of the invention relate to the communication and processing of wagering data.

BACKGROUND

The gaming industry has traditionally developed electronic gaming machines (EGMs) that implement simple chance-based wagers. However, skill-based wagering processes need communication and processing systems that are better suited for implementing these more complicated wagering processes. Various aspects of embodiments of the invention meet such a need.

SUMMARY OF THE INVENTION

Systems and methods in accordance with embodiments of the invention provide a communication and data processing system constructed for a variable skill objective wagering system.

In an embodiment, a variable skill objective wagering electronic gaming machine includes an interactive controller that receives a skill proposition for a skill-based game from a process controller, generates a player presentation based on the skill proposition, detects player interactions of a player with the player presentation, determines a skill outcome based on the player interactions and the skill proposition, and communicates the skill outcome to the process controller. The process controller operatively connected to the interactive controller, wherein the process controller is constructed to generate a random outcome using a random number generator, determine a skill objective of the skill proposition based on the random outcome, communicate the skill proposition to the interactive controller; and receive a skill outcome for the skill proposition from the interactive controller.

In some embodiments, the interactive controller and the process controller are constructed from the same device.

In various embodiments, the process controller is operatively connected to the interactive controller using a communication link.

In some embodiments, a credit processing controller and the process controller are constructed from the same device.

In many embodiments, a credit processing controller, the interactive controller, and the process controller are constructed from the same device.

In numerous embodiments, variable skill objective wagering electronic gaming machine further includes a credit processing controller, and an enclosure constructed to mount a user input device operatively connected to the interactive controller, a user output device operatively connected to the interactive controller, a credit input device operatively connected to the credit processing controller, and a credit output device operatively connected to the credit processing controller.

In some embodiments, the process controller is further constructed to communicate with the credit input device to receive a credit input, credit a credit meter with credits based on the incoming credit data, update the credit meter based on the skill outcome of the wager, and communicate with the credit output device to generate a credit output based on credits transferred off of the credit meter.

In many embodiments, the skill objective is a skill disruptor introduced into the skill-based game during the player's skillful play of the skill-based game.

In some embodiments, the skill objective is a skill enhancer introduced into the skill-based game during the player's skillful play of the skill-based game when the variable skill objective wagering electronic gaming machine determines that the player has experienced an intermediate loss in the skill-based game.

In an embodiment, a variable skill objective wagering electronic gaming machine includes an enclosure constructed to mount, a user input device, a user output device, a credit input device, a credit output device and at least one processor operatively connected to the user input device, the user output device, the credit input device, and the credit output device. The variable skill objective wagering electronic gaming machine further includes a memory operatively connected to the at least one processor, the memory storing processor executable instructions that when executed by the processor cause the processor to communicate with the credit input device to receive a credit input, credit a credit meter with credits based on the credit data, generate a random outcome using a random number generator, determine a skill objective of a skill proposition of a skill-based game based on the random outcome, generate a player presentation based on the skill proposition, present the player presentation to a player using the user output device, detect player interactions with the player presentation using the user input device, determine a skill outcome based on the player interactions and the skill proposition, update the credit meter based on the skill outcome, and communicate with the credit output device to generate a credit output based on credits transferred off of the credit meter.

In another embodiment, a process controller operates as an interface between an interactive controller that determines skill outcomes and a wagering sub-controller that determines random outcomes. By virtue of this feature, the wagering sub-controller is isolated from the interactive controller allowing the interactive controller to operate in an unregulated environment while allowing the wagering sub-controller to operate in a regulated environment, thus providing for more efficient management of the operations of such a system.

In another embodiment of the invention, a single wagering sub-controller may provide services to two or more interactive controllers, thus allowing a variable skill objective wagering system to operate more efficiently over a large range of scaling.

In another embodiment of the invention, multiple types of interactive controllers using different operating systems may be interfaced to a single type of process controller without requiring customization of the process controller and/or the wagering sub-controller, thus improving the efficiency of the process controller and/or the wagering sub-controller by reducing complexity associated with maintaining separate process controllers and/or wagering sub-controllers for each type of interactive controller.

In another embodiment of the invention, an interactive controller may be provided as a player device under control of a player while maintaining the process controller in an environment under the control of a regulated operator of wagering equipment, thus providing for a more economical system as the regulated operator need not expend capital to purchase interactive controllers.

In another embodiment of the invention, data communicated between the controllers may be encrypted to increase security of the variable skill objective wagering system.

In another embodiment of the invention, a process controller isolates random outcome logic and skill proposition logic as unregulated logic from a regulated wagering sub-controller, thus allowing errors in the skill proposition logic and/or random outcome logic to be corrected, new skill proposition logic and/or random outcome logic to be used, or modifications to be made to the skill proposition logic and/or random outcome logic without a need for time-consuming regulatory approval.

In another embodiment of the invention, an interactive application may require extensive processing resources from an interactive controller leaving few processing resources for the functions performed by a process controller and/or a wagering sub-controller. By virtue of an architecture of some embodiments of the invention, processing loads may be distributed across multiple devices such that operations of the interactive controller may be dedicated to an interactive application and the processes of the process controller and/or wagering sub-controller are not burdened by the requirements of the interactive application.

In another embodiment of the invention, a variable skill objective wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like. In many such embodiments, one or more components of a variable skill objective wagering system are distributed in close proximity to each other and communicate using a local area network and/or a communication bus. In several embodiments, an interactive controller and a process controller of a variable skill objective wagering system are in a common location. In some embodiments, a process controller communicates with an external interactive controller. In various embodiments, these multiple controllers and sub-controllers can be constructed from or configured using a single device or a plurality of devices such that a variable skill objective wagering system is executed as a system in a virtualized space such as, but not limited to, where a wagering sub-controller and a process controller are large scale centralized servers and are operatively connected to distributed interactive controllers via a wide area network such as the Internet or a local area network. In such embodiments, the components of a variable skill objective wagering system may communicate using a networking protocol or other type of device-to-device communications protocol.

In another embodiment of the invention, an interactive controller is an interactive server acting as a host for managing head-to-head player interactions over a network of interactive sub-controllers connected to the interactive server using a communication link. The interactive server provides an environment where players or players can compete directly with one another and interact with other players or players.

DETAILED DESCRIPTION

Figure 1:
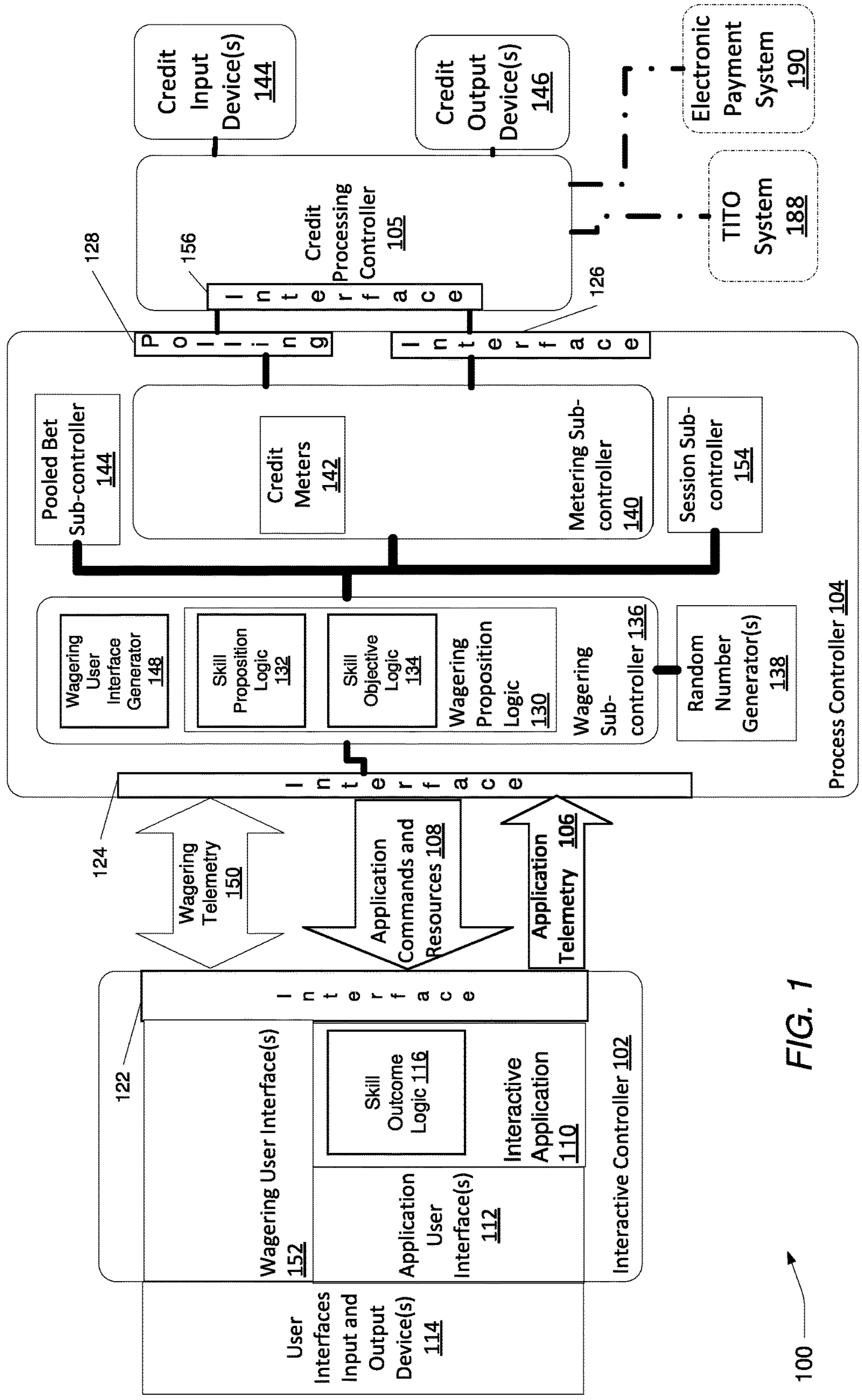
FIG. 1 is a diagram of a structure of a variable skill objective wagering system in accordance with various embodiments of the invention.

A variable skill objective wagering system allows for the management of a wagering proposition having a skill proposition for one or more players where the skill proposition has one or more skill objectives generated in accordance with a random outcome. In some embodiments of a variable skill objective wagering system, an interactive application executed by an interactive controller provides skill proposition components of the variable skill objective wagering system. The interactive controller is operatively connected to a process controller that manages and configures the interactive controller and the interactive application, and determines skill propositions having skill objectives determined by a wagering sub-controller that are resolved as skill outcomes determined by the interactive application.

In some embodiments, the interactive controller also provides a wagering user interface that is used to receive commands and display data for a wagering process and wagering outcome determined from the skill outcome in accordance with a wagering proposition. The content of the wagering user interface is controlled by the process controller and includes content provided by the wagering subcontroller and the interactive controller.

In various embodiments, an interactive controller provides a management user interface used to manage a player profile.

Many different types of interactive applications may be utilized with the variable skill objective wagering system. In some embodiments, the interactive application reacts to the physical activity of a player. In these embodiments, the interactive application senses player interactions with the interactive application through one or more sensors that monitor the player's physical activities. Such sensors may include, but are not limited to, physiological sensors that monitor the physiology of the player, environmental sensors that monitor the physical environment of the interactive controller, accelerometers that monitor changes in motion of the interactive controller, and location sensors that monitor the location of the interactive controller such as global positioning sensors.

In some embodiments, the interactive application implements a skill-based game and interacts with the player by sensing skillful interactions with an interactive user interface generated by the interactive application.

In many embodiments, the interactive application generates various types of interactive elements in an interactive application environment. In some embodiments, these interactive elements are interactive application resources utilized within the interactive application environment to provide an interactive experience for a player.

In accordance with some embodiments, a random outcome of the skill proposition can influence interactive elements in the interactive application environment such as, but not limited to, automatically providing one or more new interactive elements, automatically restoring one or more consumed interactive elements, automatically causing the loss of one or more interactive elements, and automatic restoration or placement of one or more fixed interactive elements.

In various embodiments, the wagers may be made using one or more credits.

In some embodiments, credits can be one or more credits that are purchased using, and redeemed in, a real world currency having a real world value.

In many embodiments, credits can be one or more credits in a virtual currency. Virtual currency is an alternate currency that can be acquired, purchased or transferred by or to a player, but does not necessarily directly correlate to a real world currency. In many such embodiments, credits in a virtual currency are allowed to be purchased using a real world currency but are prevented from being redeemed in a real world currency having a real world value.

In several embodiments, interaction with the interactive elements of the interactive application, application credits can be optionally consumed and/or accrued within the interactive application as a result of interaction with the interactive elements. Application credits can be in the form of, but not limited to, application environment credits, experience points, and points generally.

In various embodiments, application credits are awarded on the basis of skillful interactions with the interactive elements of a skill-based interactive application. The skill-based interactive application can have one or more scoring criteria, embedded within a process controller and/or an interactive controller that provides the skill-based interactive application, that can be used to determine player performance against one or more goals of the skill-based interactive application in accordance with a skill proposition.

In many embodiments, application credits can be used to purchase in-application items, including but not limited to, application interactive elements that have particular properties, power ups for existing items, and other item enhancements.

In some embodiments, application credits may be used to earn entrance into a sweepstakes drawing, to earn entrance in a tournament with prizes, to score in the tournament, and/or to participate and/or score in any other game event.

In several embodiments, application credits can be stored on a player-tracking card, voucher or in a network-based player tracking system where the application credits are attributed to a specific player.

In many embodiments, a wagering proposition includes a wager of application credits for payout of application credits, interactive application elements, and/or interactive application objects in accordance with the chance-based proposition.

In a number of embodiments, a wager of an amount of credits results in a payout of application credits, interactive elements, and/or interactive application objects that have a credit value if cashed out.

In some embodiments, interactive application objects include in-application objects that may be utilized to enhance player interactions with the interactive application. Such objects include, but are not limited to, power-ups, enhanced in-application items, and the like. In some embodiments, the interactive application objects include objects that are detrimental to player interactions with the interactive application such as, but not limited to, obstructions in the interactive application space, a temporary handicap, an enhanced opponent, and the like.

In numerous embodiments, an interactive application command is an instruction by a process controller to an interactive controller and/or an interactive application of the interactive controller to modify a state of an interactive application or modify one or more interactive application resources or interactive elements. In some embodiments, the interactive application commands may be automatically generated by the process controller using one or more of a random outcome and/or application environment variables. An interactive application command can be used by a process controller control many processes of an interactive application, such as, but not limited to, an causing an addition of a period of time available for a current interactive application session for the interactive application, an addition of a period of time available for a future variable skill objective wagering system interactive application session or any other modification to the interactive application interactive elements that can be utilized during an interactive application session.

In some embodiments, asynchronous communications provided for by a variable skill objective wagering system may reduce an amount of idle waiting time by an interactive controller of the variable skill objective wagering system, thus increasing an amount of processing resources that the interactive controller may provide to an interactive application or other processes of the interactive controller. In many embodiments, asynchronous communications provided for by a variable skill objective wagering system reduces an amount of idle waiting time by a process controller, thus increasing an amount of processing resources that the process controller may provide to determine random outcomes, and other processes provided by the process controller.

In some embodiments, a wagering sub-controller of a variable skill objective wagering system may be operatively connected to a plurality of interactive controllers through a process controller and the asynchronous communications provided for by the process controllers allows the wagering sub-controller to operate more efficiently by providing random outcomes to a larger number of interactive controllers than would be achievable without the process controller of the variable skill objective wagering system.

In some embodiments, a variable skill objective wagering system including a process controller operatively connected to a wagering sub-controller and operatively connected to an interactive controller wherein the process controller provides for simplified communication protocols for communications of the interactive controller as the interactive controller may communicate interactions with an interactive application provided by the interactive controller to the process controller without regard to a nature of a chance-based proposition.

In various embodiments, a variable skill objective wagering system including a process controller operatively connected to a wagering sub-controller and operatively connected to an interactive controller may provide for simplified communication protocols for communications of the wagering sub-controller as the wagering sub-controller may receive skill proposition requests and communicate determined skill propositions having skill objectives without regard to a nature of an interactive application provided by the interactive controller.

In some embodiments, a variable skill objective wagering system including a process controller operatively connecting a wagering sub-controller to an interactive controller may provide for reduced processing requirement for the interactive controller by offloading the execution of a random number generator from the interactive controller to the process controller. In various such embodiments, additional processing resources may be made available to graphics processing or other processing intensive operations by the interactive controller because of the offloaded random number processing.

In various embodiments, a variable skill objective wagering system including a process controller operatively connecting a wagering sub-controller to an interactive controller provides for operation of the interactive controller in an unsecure location or manner, while providing for operation of the wagering sub-controller in a secure location or manner.

In some embodiments, a variable skill objective wagering system including a process controller operatively connecting a wagering sub-controller to an interactive controller allows the variable skill objective wagering system to have regulated components coupled to unregulated components in a heterogeneous regulated environment. For example, in several such embodiments, the interactive controller may be a device that is not regulated by a wagering regulatory agency whereas the wagering sub-controller is regulated by the wagering regulatory agency. A process controller of a variable skill objective wagering system may provide for isolation of the processing of the interactive controller from the processing of the wagering sub-controller. In such a heterogeneous regulatory environment, the process controller may or may not be itself a regulated by the wagering regulatory authority. In addition, components of an interactive application executed by the interactive controller may be either regulated or unregulated by the wagering regulatory agency.

FIG. 1 is a diagram of a structure of a variable skill objective wagering system in accordance with various embodiments of the invention. The variable skill objective wagering system 100 includes an interactive controller 102, a process controller 104, and a credit processing controller 105. The interactive controller 102 is operatively connected to, and communicates with, the process controller 104. The process controller 104 is also operatively connected to, and communicates with, the credit processing controller 105.

In various embodiments, the interactive controller 102 executes an interactive application 110 and provides one or more user interface input and output devices 114 so that one or more players can interact with the interactive application 110. In various embodiments, user interface input devices include, but are not limited to: buttons or keys; keyboards; keypads; game controllers; joysticks; computer mice; track balls; track buttons; touch pads; touch screens; accelerometers; motion sensors; video input devices; microphones; and the like. In various embodiments, user interface output devices include, but are not limited to: audio output devices such as speakers, headphones, earbuds, and the like; visual output devices such as lights, video displays and the like; and tactile devices such as rumble pads, hepatic touch screens, buttons, keys and the like. The interactive controller 102 provides for player interactions with the interactive application 110 by executing the interactive application 110 that generates an application user interface 112 that utilizes the user interface input devices to detect player interactions with the interactive controller 102 and generates an interactive user interface that is presented to the player utilizing the user interface output devices.

In some embodiments, one or more components an interactive controller are housed in an enclosure such as a housing, cabinet, casing or the like. The enclosure further includes one or more player accessible openings or surfaces that constructed to mount the user interface input devices and/or the user interface output devices.

The interactive controller 102 is operatively connected to, and communicates with, the process controller 104. The interactive controller 102 receives application command and resource data 108 including skill proposition data, application command data, and resource data, from the process controller 104. Via the communication of the application command and resource data 108, the process controller 104 can control the operation of the interactive controller 102 by communicating control parameters to the interactive application 110 during the interactive application's execution by the interactive controller 102.

In some embodiments, during execution of the interactive application 110 by the interactive controller 102, the interactive controller 102 communicates, as application telemetry data 106, player interactions with one or more interactive elements of the application user interfaces 112 of the interactive application to the process controller 104. The application telemetry data 106 may include, but is not limited to, application environment variables that indicate the state of the interactive application 110, interactive controller data indicating a state of the interactive controller 102, player actions and interactions between one or more players and the interactive application 110 provided by the interactive controller 102, and utilization of interactive elements in the interactive application 110 by one or more players.

In some embodiments, the application telemetry 106 includes a skill outcome as determined by the interactive application 110 using skill outcome logic 116, the application command and resource data 108, and player interactions with one or more application user interfaces 112 of the interactive application.

In some embodiments, the interactive application 110 is a skill-based interactive application. In such embodiments, execution of the skill-based interactive application 110 by the interactive controller 102 is based on one or more players' skillful interaction with the interactive application 110, such as, but not limited to, the players' utilization of the interactive elements of the interactive application during the players' skillful interaction with the skill-based interactive application. In such an embodiment, the process controller 104 communicates with the interactive controller 102 in order to allow the coupling of the skill-based interactive application to skill objectives determined in accordance with a skill proposition determined by the wagering sub-controller 136.

In some embodiments, the interactive application 110 uses skill proposition data, interactive application command data, and/or resource data included in the application commands and resources 108 to generate a skill proposition presented to one or more players as one or more application user interfaces 112 using one or more output devices of user interface and output device(s) 114. The one or more players skillfully interact with the one or more application user interfaces 112 using one or more of input devices of the user interface input and output devices 114. The interactive application 110 determines a skill outcome based on the skillful interactions of the one or more players and communicates data of the determined skill outcome to the process controller 104 as part of the application telemetry 106. In some embodiments, the interactive application 110 also communicates as part of the application telemetry data 106, data encoding the one or more players' interactions with the interactive application 110.

In some embodiments, the skill outcome logic 116 and the skill proposition data included in the application commands and resources 108 are for a skill proposition for one or more players. The interactive application 110 determines skill outcomes based on the skill proposition and the one or more players' skillful interactions with the interactive application. The skill outcomes are communicated by the interactive controller 102 to the process controller 104 included in the application telemetry 106.

In some embodiments, the interactive controller 102 includes one or more sensors that sense various aspects of the physical environment of the interactive controller 102. Examples of sensors include, but are not limited to: global positioning sensors (GPSs) for sensing communications from a GPS system to determine a position or location of the interactive controller; temperature sensors; accelerometers; pressure sensors; and the like. Sensor telemetry data is communicated by the interactive controller to the process controller 104 as part of the application telemetry data 106. The process controller 104 receives the sensor telemetry data and uses the sensor telemetry data to make wagering decisions.

In many embodiments, the interactive controller 102 includes one or more wagering user interfaces 118 used to display wagering data, via one or more of the user interface input and output devices 114, to one or more players.

In various embodiments, an application control interface 122 resident in the interactive controller 102 provides an interface between the interactive controller 102 and the process controller 104.

In some embodiments, the application control interface 122 implements an interactive controller to process controller communication protocol employing an interprocess communication protocol so that the interactive controller and the process controller may be implemented on the same device. In operation, the application control interface 122 provides application programming interfaces that are used by the interactive application 110 of the interactive controller 102 to communicate outgoing data and receive incoming data by passing parameter data to another process or application.

In some embodiments, the application control interface 122 implements an interactive controller to process controller communication protocol employing an interdevice communication protocol so that the interactive controller and the process controller may be implemented on different devices. The interdevice protocol may utilize a wired communication bus or wireless connection as a physical layer.

In various embodiments, the application control interface 122 implements an interactive controller to process controller communication protocol employing a networking protocol so that the interactive controller and the process controller may be implemented on different devices connected by a network. The networking protocol may utilize a wired communication bus or wireless connection as a physical layer. In many such embodiments, the network includes a cellular telephone network or the like and the interactive controller is a mobile device such as a smartphone or other device capable of using the telephone network. During operation, the application control interface 122 communicates outgoing data to an external device by encoding the data into a signal and transmitting the signal to an external device. The application control interface receives incoming data from an external device by receiving a signal transmitted by the external device and decoding the signal to obtain the incoming data.

The process controller 104 provides an interface between a skill proposition resolved for one or more players when skillfully interacting with the interactive application 110 provided by the interactive controller 102, and a skill objective, provided in-part by a wagering sub-controller 136.

In various embodiments, the process controller 104 includes a wagering sub-controller 136 having a rule-based decision engine that receives application telemetry data 106 from the interactive controller 102. The rule-based decision engine has wagering proposition logic 130 including skill proposition logic 132 and skill objective logic 134. The decision engine uses the application telemetry data 106, along with skill objective logic 134, and a random outcome generated by one or more random number generators (RNGs) 138 to generate a skill objective of a skill proposition.

In an embodiment, the application telemetry data 106 used by the decision engine encodes data about the operation of the interactive application 110 executed by the interactive controller 102.

In some embodiments, the application telemetry data 106 encodes interactions of a player, such as a player's interaction with an interactive element of the interactive application 110.

In many embodiments, the application telemetry data 106 includes a state of the interactive application 110, such as values of variables that change as the interactive application 110 executes.

In several embodiments, the decision engine includes one or more rules as part of skill objective logic 134 used by the decision engine 122 to determine how a skill objective should generated. Each rule includes one or more variable values constituting a pattern that is to be matched by the wagering sub-controller 136 using the decision engine to one or more variable values encoded in the application telemetry data 106. Each rule also includes one or more actions that are to be taken if the pattern is matched. Actions can include automatically generating the skill objective in accordance with the skill objective logic 134 and a random outcome generated by one or more random number generators 138. During operation, the decision engine receives application telemetry data 106 from the interactive controller 102 via interface 160. The decision engine performs a matching process of matching the variable values encoded in the application telemetry data 106 to one or more variable patterns of one or more rules. If a match between the variable values and a pattern of a rule is determined, then the wagering controller 104 performs the action of the matched rule.

In some embodiments, the wagering sub-controller 136 uses the skill objective in conjunction with the application telemetry data 106 and skill proposition logic 132, to automatically generate application command and resource data 108 including skill proposition data of a skill proposition that the process controller 104 communicates to the interactive controller 102 via interfaces 124 and 122.

In some embodiments, the decision engine includes one or more rules as part of skill proposition logic 132 used by the decision engine to automatically generate the application command and resource data 108 that is then communicated to the interactive controller 102. Each rule includes one or more variable values constituting a pattern that is to be matched to one or more variable values encoded in the application telemetry data 106 and the skill objective. Each rule also includes one or more actions that are to be automatically taken by the wagering sub-controller 136 if the pattern is matched. Actions can include automatically generating skill proposition data, interactive application command data, and/or resource data 108 and using the skill proposition data, interactive application command data, and/or resource data 108 to control the interactive controller 102 to affect execution of the interactive application 110 as described herein. In operation, wagering sub-controller 104 uses the decision engine 122 to match the variable values encoded in the in the skill objective data to one or more patterns of one or more rules of the skill proposition logic 132. If a match between the variable values and a pattern of a rule is found, then the process controller automatically performs the action of the matched rule. In some embodiments, the process controller 104 uses the application telemetry data 106 received from the interactive controller 102 in conjunction with the skill objective to generate the skill proposition data, interactive application command data, and/or resource data 108.

The interactive controller receives the skill proposition data, interactive application command data, and resource data 108 and automatically uses the skill proposition data, interactive application command data, and/or resource data 108 to configure and command the processes of the interactive application 110.

In some embodiments, the interactive application 110 operates utilizing a scripting language. The interactive application 110 parses scripts written in the scripting language and executes commands encoded in the scripts and sets variable values as defined in the scripts. In operation of such embodiments, the process controller 104 automatically generates skill proposition data, interactive application command data, and/or resource data 108 in the form of scripts written in the scripting language that are communicated to the interactive controller 102 during execution of the interactive application 110. The interactive controller 102 receives the scripts and passes them to the interactive application 110. The interactive application 110 receives the scripts, parses the scripts and automatically executes the commands and sets the variable values as encoded in the scripts.

In many embodiments, the interactive application 110 automatically performs processes as instructed by commands communicated from the process controller 104. The commands command the interactive application 110 to perform specified operations such as executing specified commands and/or setting the values of variables utilized by the interactive application 110. In operation of such embodiments, the process controller 104 automatically generates commands that are encoded into the skill proposition data, interactive application command data, and/or resource data 108 that are communicated to the interactive controller 102. The interactive controller 102 passes the skill proposition data, interactive application command data, and/or resource data 108 to the interactive application 110. The interactive application parses the skill proposition data, interactive application command data, and/or resource data and automatically performs operations in accordance with the commands encoded in the skill proposition data, interactive application command data, and/or resource data 108.

In many embodiments, the process controller 104 includes a random number generator used to generate random outcomes that are used by the decision engine to generate portions of the skill proposition data, interactive application command data, and/or resource data 108.

In various embodiments, the process controller 104 includes one or more interfaces, 124, 126 and 128 that operatively connect the process controller 104 to one or more interactive controllers, such as interactive controller 102, and to one or more credit processing controllers, such as credit processing controller 105.

In some embodiments, one or more of the process controller interfaces implement a process controller to device or server communication protocol employing an interprocess communication protocol so that the process controller and one or more of an interactive controller, a wagering sub-controller, and/or a session sub-controller may be implemented on the same device. In operation, the process controller interfaces provide application programming interfaces or the like that are used by the process controller to communicate outgoing data and receive incoming data by passing parameter data to another process or application running on the same device.

In some embodiments, one or more of the process controller interfaces implement a process controller communication protocol employing an interdevice communication protocol so that the process controller may be implemented on a device separate from the one or more interactive controllers, the one or more session sub-controllers and/or the one or more wagering sub-controllers. The interdevice protocol may utilize a wired communication bus or wireless connection as a physical layer. In various embodiments, one or more of the process controller interfaces implement a process controller communication protocol employing a networking protocol so that the process controller may be operatively connected to the one or more interactive controllers, the one or more session sub-controllers, and/or the one or more wagering sub-controllers by a network. The networking protocol may utilize a wired communication bus or wireless connection as a physical layer. In many such embodiments, the network includes a cellular telephone network or the like and the one or more interactive controllers include a mobile device such as a smartphone or other device capable of using the telephone network. During operation, the one or more process controller interfaces communicate outgoing data to an external device or server by encoding the data into a signal and transmitting the signal to the external device or server. The one or more process controller interfaces receive incoming data from an external device or server by receiving a signal transmitted by the external device or server and decoding the signal to obtain the incoming data.

In several embodiments, the wagering sub-controller 136 is a controller for providing one or more wagers in accordance with one or more skill propositions provided by the variable skill objective wagering system 100. Types of value of a wager can be one or more of several different types. Types of value of a wager can include, but are not limited to, a wager of an amount of credits corresponding to a real currency or a virtual currency, a wager of an amount of application credits earned through interaction with an interactive application, a wager of an amount of interactive elements of an interactive application, and a wager of an amount of objects used in an interactive application. A skill outcome determined for a wager in accordance with a skill proposition can increase or decrease an amount of the type of value used in the wager, such as, but not limited to, increasing or decreasing an amount of credits for a wager of credits. In various embodiments, a skill outcome determined for a wager in accordance with a skill proposition can increase or decrease an amount of a type of value that is different than a type of value of the wager, such as, but not limited to, increasing an amount of an object of an interactive application for a wager of credits.

In many embodiments, the process controller 104 includes one or more random number generators (RNGs) 138 for generating random outcomes. The wagering sub-controller uses the one or more random outcomes along with the skill objective logic 130 to generate a skill objective of a skill proposition.

In several embodiments, the process controller 104 includes a metering sub-controller 140 operatively connected to the credit processing controller 105 via interfaces 126 and 128. The metering sub-controller 140 communicates with the credit processing controller 105 to receive incoming credit data from the credit processing controller 105. The metering sub-controller 140 uses the incoming credit data to transfer credits into the variable skill objective wagering system and onto one or more credit meters 142. The metering sub-controller 140 communicates outgoing credit data to the credit processing controller 105 to transfer credits off of the one or more credit meters 142 and out of the variable skill objective wagering system.

In several embodiments, during operation, the metering sub-controller 140 communicates with the credit processing controller 105 to receive incoming credit data from the credit processing controller 105 and adds credits onto the one or more credit meters 110 at least partially on the basis of the incoming credit data. The one or more random number generators 138 execute processes that generate cs. The wagering sub-controller 136 uses the change-based component logic 134 and the random outcomes to generate a skill objective of a skill proposition. The wagering sub-controller uses the skill objective along with the skill proposition logic 132 to generate a skill proposition. The skill proposition is communicated by the process controller as part of the application command and resource data 108 to the interactive controller 102. The interactive application 110 uses the skill proposition data along with the skill outcome logic 116 to generate a presentation for the user including the one or more user interfaces 112. One or more players interact with the one or more application user interfaces 112 through the one or more user interface input and output devices 114. The interactive application 110 determines a skill outcome based on the interactions of the one or more players and communicates data of the skill outcome as part of the application telemetry data 106 to the process controller 104. The wagering sub controller 136 receives the skill outcome data and instructs the metering sub-controller 140 to add credits to, or deduct credits from, the one or more credit meters 110 based in part on the skill outcome data. For example, in some embodiments, the metering sub-controller is instructed to add an amount of credits to a credit meter of the one or more credit meters 110 when the skill outcome indicates a win for a player associated with the credit meter. In various embodiments, the metering sub-controller is instructed to deduct an amount of credits from the credit meter when the skill outcome indicates a loss for the player. At an end of a wagering session, the metering sub-controller 140 transfers credits off of the one or more credit meters 110 and out of the variable skill objective wagering system by communicating outgoing credit data to the credit processing controller 105.

In many embodiments, the one or more random number generators 138 generate random numbers by continuously generating pseudo random numbers using a pseudo random number generator. A most current pseudo random number is stored in a buffer thus constantly refreshing the buffer. In many embodiments, the buffer is refreshed at a rate exceeding 100 times per second. When the wagering sub-controller 136 requests a random outcome, the wagering sub-controller 136 receives the stored most current pseudo random number from the buffer. As timing between requests for a random outcome is not deterministic, the resulting output from the buffer is a random outcome such as a random number.

In some embodiments, a wagering sub-controller determines a skill objective and a skill proposition by executing proposition determination commands included in skill objective logic and skill proposition logic that define processes of a wagering proposition where the proposition determination commands are formatted in a scripting language. In operation, a decision engine of a process controller generates the proposition determination commands in the form of a script written in the scripting language. The script includes the proposition determination commands that describe how the wagering sub-controller is to generate a skill proposition. The wagering sub-controller parses the script encoded in the chance proposition determination command data and executes the commands included in the script to generate the skill proposition.

In some embodiments, a wagering sub-controller determines a skill objective and a skill proposition by executing proposition determination commands that define processes of the wagering user interface. In operation, a decision engine of a process controller generates the proposition determination commands. The wagering sub-controller receives the proposition determination commands and executes the proposition determination commands to generate the skill proposition.

In various embodiments, the process controller 104 uses a rule-based decision engine to automatically determine an amount of application credits to award to a player based at least in part on the application telemetry data 106 including skill outcome data and player interaction data with the interactive application 110 of the variable skill objective wagering system. In numerous embodiments, the interactive application 110 is a skill-based interactive application and the application credits are awarded for a player's skillful interaction with the interactive application 110.

In some embodiments, the wagering sub-controller 136 uses a wagering user interface generator 148 to automatically generate wagering telemetry data 150 on the basis of amounts of credits on the one or more credit meters 142. The wagering telemetry data 150 is used by the process controller 104 to command the interactive controller 102 to automatically generate one or more wagering user interfaces 152 describing a state of wagered credit accumulation and loss for the variable skill objective wagering system. When a player interacts with the one or more wagering user interfaces 152, wagering user interface telemetry data 150 is generated by the one or more wagering user interfaces 152 and communicated by the interactive controller 102 to the process controller 104 using interfaces 122 and 124.

In some embodiments, the wagering telemetry data 150 may include, but is not limited to, amounts of application credits and interactive elements earned, lost or accumulated through interaction with the interactive application 110, and credits, application credits and interactive elements amounts won, lost or accumulated.

In some embodiments, the skill proposition data, interactive application command data, and/or resource data 108 are communicated to the wagering user interface generator 148 and used as a partial basis for generation of the wagering telemetry data 150 communicated to the interactive controller 102.

In various embodiments, the wagering user interface generator 148 also receives skill objective data that is used as a partial basis for generation of the wagering telemetry data 150 communicated to the interactive controller 102. In some embodiments, the skill objective data also includes data about one or more states of a wager of the skill proposition as generated by the wagering sub-controller 136. In various such embodiments, the wagering user interface generator 148 generates a skill objective generation process display and/or skill objective state display using the one or more states of the skill objective. The skill objective generation process display and/or skill objective state display is included in the wagering telemetry data 150 that is communicated to the interactive controller 102. The wagering process display and/or wagering state display is automatically displayed by the interactive controller 102 using the one or more wagering user interfaces 152. In other such embodiments, the one or more states of the skill objective are communicated to the interactive controller 102 and the interactive controller 102 is instructed to automatically generate the skill objective generation process display and/or skill objective state display of the one or more wagering user interfaces 152 using the one or more states of the skill objective for display.

In some embodiments, the skill objective includes state data about execution of a skill proposition of the skill objective logic 134, including but not limited to a final state, intermediate state and/or beginning state of the chance-based proposition. For example, in a chance-based proposition that is based on slot machine math, the final state of the chance-based proposition may be reel positions, in a chance-based proposition that is based on roulette wheel math, the final state may be a pocket where a ball may have come to rest, in a chance-based proposition that is a based on card math, the beginning, intermediate and final states may represent a sequence of cards being drawn from a deck of cards, etc.

In some embodiments, an interactive controller generates a wagering user interface by executing commands that define processes of the wagering user interface where the commands are formatted in a scripting language. In operation, a wagering user interface generator of a process controller generates commands in the form of a script written in the scripting language. The script includes commands that describe how the interactive controller is to display wagering outcome data. The completed script is encoded as wagering telemetry data and communicated to the interactive controller by the process controller. The interactive controller receives the wagering telemetry data and parses the script encoded in the wagering telemetry data and executes the commands included in the script to generate the wagering user interface.

In many embodiments, an interactive controller generates a wagering user interface based on a document written in a document markup language that includes commands that define processes of the wagering user interface. In operation, a wagering user interface generator of a process controller generates a document composed in the document markup language. The document includes commands that describe how the interactive controller is to display wagering outcome data. The completed document is encoded as wagering telemetry data and communicated to the interactive controller by the process controller. The interactive controller receives the wagering telemetry data and parses the document encoded in the wagering telemetry data and executes the commands encoded into the document to generate the wagering user interface.

In some embodiments, an interactive controller generates a wagering user interface by executing commands that define processes of the wagering user interface. In operation, a wagering user interface generator of a process controller generates the commands and encodes the commands into wagering telemetry data that is communicated to the interactive controller by the process controller. The interactive controller receives the wagering telemetry data and executes the commands encoded in the wagering telemetry data to generate the wagering user interface.

In various embodiments, an interactive controller includes a data store of graphic and audio display resources that the interactive controller uses to generate a wagering user interface as described herein.

In many embodiments, a process controller communicates graphic and audio display resources as part of wagering telemetry data to an interactive controller. The interactive controller uses the graphic and audio display resources to generate a wagering user interface as described herein.

In many embodiments, the process controller 104 may additionally include various audit logs and activity meters.

The process controller 104 can further operatively connect to a metering sub-controller to determine an amount of credit or interactive elements available and other wagering metrics of a wagering proposition. Thus, the process controller 104 may potentially affect an amount of credits in play for participation in the wagering events of the wagering proposition provided by the wagering sub-controller. In some embodiments, the process controller 104 can also couple to a centralized server for exchanging various data related to players or players and the activities of the players or players during utilization of a variable skill objective wagering system.

In a number of embodiments, communication of skill objective determination commands and skill proposition commands between the wagering sub-controller 136 and the process controller 104 can further be used to communicate various wagering control factors that the wagering sub-controller uses as input. Examples of wagering control factors include, but are not limited to, an amount of credits, amount of application credits, amount of interactive elements, or amounts of objects consumed wager, and/or a player's election to enter a jackpot round.

In many embodiments, two or more players or players can be engaged in using the interactive application 110 executed by the interactive controller 102. In various embodiments, a variable skill objective wagering system can include an interactive application 110 that provides a skill-based interactive application that includes head-to-head play between a single player and a computing device, between two or more players or players against one another, or multiple players or players playing against a computer device and/or each other. In some embodiments, the interactive application 110 can be a skill-based interactive application where the player is not skillfully playing against the computer or any other player such as skill-based interactive applications where the player is effectively skillfully playing against himself or herself.

In some embodiments, the process controller 104 utilizes the one or more wagering user interfaces 152 to communicate certain interactive application data to the player, including but not limited to, club points, player status, control of the selection of choices, and messages which a player can find useful in order to adjust the interactive application experience or understand the wagering status of the player.

In some embodiments, the process controller 104 utilizes the one or more wagering user interfaces 152 to communicate aspects of a wagering proposition to a player including, but not limited to, amount of credits, application credits, interactive elements, or objects in play, and amounts of credits, application credits, interactive elements, or objects available.

In a number of embodiments, the wagering sub-controller 136 can accept wagering proposition factors including, but not limited to, modifications in the amount of credits, application credits, interactive elements, or objects wagered on each individual wagering event, entrance into a bonus round, and other factors. In several embodiments, the process controller 104 can communicate a number of factors back and forth to the wagering sub-controller, such that an increase/decrease in a wagered amount can be related to the change in player profile of the player in the interactive application. In this manner, a player can control a wager amount per wagering event in accordance with the wagering proposition with the change mapping to a parameter or component that is applicable to the interactive application experience.

In some embodiments, the process controller 104 includes a session sub-controller 154 is used to regulate a variable skill objective wagering system session.

In various embodiments, the session sub-controller 154 includes one or more session sub-controller interfaces that operatively connect the session sub-controller 154 to one or more wagering sub-controllers, metering sub-controllers and pooled bet sub-controllers through their respective interfaces.

In some embodiments, one or more of the session sub-controller interfaces implement a session sub-controller to device or server communication protocol employing an interprocess communication protocol so that the session sub-controller and one or more of an interactive controller, a wagering sub-controller, and/or a process controller may be implemented on the same device. In operation, the session sub-controller interfaces provide application programming interfaces or the like that are used by the session sub-controller to communicate outgoing data and receive incoming data by passing parameter data to another process or application running on the same device.

In some embodiments, one or more of the session sub-controller interfaces implement a session sub-controller communication protocol employing an interdevice communication protocol so that the session sub-controller may be implemented on a device separate from the one or more interactive controllers, the one or more process controllers and/or the one or more wagering sub-controllers. The interdevice protocol may utilize a wired communication bus or wireless connection as a physical layer. In various embodiments, one or more of the session sub-controller interfaces implement a session sub-controller communication protocol employing a networking protocol so that the process session sub-controller may be operatively connected to the one or more interactive controllers, the one or more process controllers, and/or the one or more wagering sub-controllers by a network. The networking protocol may utilize a wired communication bus or wireless connection as a physical layer. In many such embodiments, the network includes a cellular telephone network or the like and the one or more interactive controllers include a mobile device such as a smartphone or other device capable of using the telephone network. During operation, the one or more session sub-controller interfaces communicate outgoing data to an external device or server by encoding the data into a signal and transmitting the signal to the external device or server. The one or more session sub-controller interfaces receive incoming data from an external device or server by receiving a signal transmitted by the external device or server and decoding the signal to obtain the incoming data.

In various embodiments, components of the process controller 104 communicate session data to the session sub-controller. The session data may include, but is not limited to, player data, interactive controller data, pooled bet and side bet data, process controller data and wagering sub-controller data used by the session sub-controller to regulate a variable skill objective wagering system session.

In some embodiments, the session sub-controller 154 may also assert control of a variable skill objective wagering system session by communicating session control data to components of the process controller 104. Such control may include, but is not limited to, commanding the process controller 104 to end a variable skill objective wagering system session, initiating wagering in a variable skill objective wagering system session, ending wagering in a variable skill objective wagering system session but not ending a player's use of the interactive application portion of the variable skill objective wagering system, and changing from real credit wagering in a variable skill objective wagering system to virtual credit wagering, or vice versa.

In many embodiments, the session sub-controller 154 manages player profiles for a plurality of players or players. The session sub-controller 154 stores and manages data about players or players in order to provide authentication and authorization of players or players of the variable skill objective wagering system 100. In some embodiments, the session sub-controller 154 also manages geolocation information to ensure that the variable skill objective wagering system 100 is only used by players or players in jurisdictions were wagering is approved. In various embodiments, the session sub-controller 154 stores application credits that are associated with the player's use of the interactive application of the variable skill objective wagering system 100.

In some embodiments, the session sub-controller 154 communicates player and session management data to the player using a management user interface (not shown) of the interactive controller. The player interacts with the management user interface and the management user interface generates management telemetry data that is communicated to the session sub-controller 154 via interfaces 122 and 124.

In some embodiments, the wagering sub-controller 136 communicates wagering session data to the session sub-controller 154. In various embodiments, the session sub-controller communicates wagering session control data to the wagering sub-controller 136.

In some embodiments, a process controller operates as an interface between an interactive controller and a wagering sub-controller. By virtue of this construction, the wagering sub-controller is isolated from the interactive controller allowing the interactive controller to operate in an unregulated environment while allowing the wagering sub-controller to operate in a regulated environment.

In some embodiments, a single wagering sub-controller may provide services to two or more interactive controllers and/or two or more process controllers, thus allowing a variable skill objective wagering system to operate over a large range of scaling.

In various embodiments, multiple types of interactive controllers using different operating systems may be interfaced to a single type of process controller and/or wagering sub-controller without requiring customization of the process controller and/or the wagering sub-controller.

In many embodiments, an interactive controller may be provided as a player device under control of a player while maintaining the wagering sub-controller in an environment under the control of a regulated operator of wagering equipment.

In several embodiments, data communicated between the controllers may be encrypted to increase security of the variable skill objective wagering system.

In some embodiments, a process controller isolates skill objective logic and skill proposition logic as unregulated logic from a regulated wagering sub-controller, thus allowing errors in the skill proposition logic and/or skill objective logic to be corrected, new skill proposition logic and/or skill objective logic to be used, or modifications to be made to the skill proposition logic and/or skill objective logic without a need for regulatory approval.

In various embodiments, an interactive application may require extensive processing resources from an interactive controller leaving few processing resources for the functions performed by a process controller and/or a wagering sub-controller. By virtue of the architecture described herein, processing loads may be distributed across multiple devices such that operations of the interactive controller may be dedicated to the interactive application and the processes of the process controller and/or wagering sub-controller are not burdened by the requirements of the interactive application.

In many embodiments, a variable skill objective wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like.

In some embodiments, one or more components of a variable skill objective wagering system are distributed in close proximity to each other and communicate using a local area network and/or a communication bus. In several embodiments, an interactive controller and a process controller of a variable skill objective wagering system are in a common location and communicate with an external wagering sub-controller. In some embodiments, a process controller and a wagering sub-controller of a variable skill objective wagering system are in a common location and communicate with an external interactive controller. In many embodiments, an interactive controller, a process controller, and a wagering sub-controller of a variable skill objective wagering system are located in a common location. In some embodiments, a session sub-controller is located in a common location with a process controller and/or a wagering sub-controller.

In various embodiments, these multiple devices can be constructed from or configured using a single device or a plurality of devices such that a variable skill objective wagering system is executed as a system in a virtualized space such as, but not limited to, where a wagering sub-controller and a process controller are large scale centralized servers in the cloud operatively connected to widely distributed interactive controllers via a wide area network such as the Internet or a local area network. In such embodiments, the components of a variable skill objective wagering system may communicate using a networking protocol or other type of device-to-device communications protocol.

In some embodiments, a variable skill objective wagering system is deployed over a local area network or a wide area network in an interactive configuration. An interactive configuration of a variable skill objective wagering system includes an interactive controller operatively connected by a network to a process controller and a wagering sub-controller.

In some embodiments, a variable skill objective wagering system is deployed over a local area network or a wide area network in a mobile configuration. A mobile configuration of a variable skill objective wagering system is useful for deployment over wireless communication network, such as a wireless local area network or a wireless telecommunications network. A mobile configuration of a variable skill objective wagering system includes an interactive controller operatively connected by a wireless network to a process controller and a wagering sub-controller.

In several embodiments, a centralized process controller is operatively connected to one or more interactive controllers and one or more wagering sub-controllers using a communication link. The centralized process controller can perform the functionality of a process controller across various variable skill objective wagering systems.

In numerous embodiments, an interactive application server provides a host for managing head-to-head play operating over a network of interactive controllers connected to the interactive application server using a communication link. The interactive application server provides an environment where players or players can compete directly with one another and interact with other players or players.

<Credit Processing Controller>

In many embodiments, the credit processing controller 105 operatively connects to one or more credit input devices for generating incoming credit data from a credit input. Credit inputs can include, but are not limited to, credit items used to transfer credits. The incoming credit data are communicated by the credit processing controller 105 to the metering sub-controller 140. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, TITO tickets, rewritable cards, or the like; and bill validator and/or coin validators that receive and validate paper and/or coin currency or tokens.

In various embodiments, the credit processing controller 105 includes one or more credit output devices 146 for generating a credit output based on outgoing credit data 192 communicated from the wagering sub-controller. Credit outputs can include, but are not limited to, credit items used to transfer credits. Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the credit processing controller 105 is operatively connected to, and communicates with, a TITO system 188 or the like to determine incoming credit data representing amounts of credits to be transferred into the variable skill objective wagering system and to determine outgoing credit data representing amounts of credits to be transferred out of the variable skill objective wagering system. In operation, the credit processing controller 105 communicates with a connected credit input device, such as a bill validator/ticket scanner, used to scan a credit input in the form of a TITO ticket having indicia of credit account data of a credit account of the TITO system. The credit processing controller 105 communicates the credit account data to the TITO system. The TITO system uses the credit account data to determine an amount of credits to transfer to the credit processing controller 105, and thus to the metering sub-controller 140 of the process controller 104. The TITO system communicates the amount of credits to the credit processing controller 105. The credit processing controller 105 communicates the amount of credits as incoming credit data to the metering sub-controller 140 and the metering sub-controller 140 credits one or more credit meters 142 with the amount of credits so that the credits can be used when a player makes wagers using the variable skill objective wagering system 100.

In many embodiments, the credit processing controller 105 is operatively connected to a bill validator/ticket scanner as one of the one or more credit input devices 144. The credit processing controller 105 communicates with the bill validator/ticket scanner to scan currency used as a credit input to determine an amount of credits as incoming credit data to transfer credit to one or more credit meters 110 associated with one or more players. The skill metering sub-controller 140 credits the one or more credit meters 110 with the amount of credits so that the credits can be used when a player makes wagers using the variable skill objective wagering system 100.

In some embodiments, the credit processing controller 105 can use a TITO system along with a ticket or voucher printer as one of the one or more credit output devices 146 to generate a TITO ticket as a credit output for a player. In operation, the credit processing controller 105 communicates, as outgoing credit data, data of an amount of credits to be credited to a credit account on the TITO system. The TITO system receives the amount of credits and creates the credit account and credits the credit account with the amount of credits. The TITO system generates credit account data for the credit account and communicates the credit account data to the credit processing controller 105. The credit processing controller 105 uses the ticket or voucher printer to print indicia of the credit account data onto a TITO ticket or voucher as a credit output.

In various embodiments, a credit processing interface 156 resident in the credit processing controller 105 provides an interface between the credit processing controller 156 and the process controller 104.

In some embodiments, the application control interface 122 implements a credit processing controller to process controller communication protocol employing an interprocess communication protocol so that the interactive controller 104 and the credit processing controller 105 may be implemented on the same device. In operation, the credit processing interface 156 provides application programming interfaces that are used by the credit processing controller 105 to communicate outgoing data and receive incoming data by passing parameter data to another process or application.

In some embodiments, the credit processing interface 156 implements an interactive controller to credit processing controller communication protocol employing an interdevice communication protocol so that the interactive controller and the credit processing controller may be implemented on different devices. The interdevice protocol may utilize a wired communication bus or wireless connection as a physical layer.

In various embodiments, the credit processing interface 156 implements an interactive controller to credit processing controller communication protocol employing a networking protocol so that the interactive controller 104 and the credit processing controller 105 may be implemented on different devices connected by a network. The networking protocol may utilize a wired communication bus or wireless connection as a physical layer. During operation, the credit processing interface 156 communicates outgoing data to an external device by encoding the data into a signal and transmitting the signal to an external device. The application control interface receives incoming data from an external device by receiving a signal transmitted by the external device and decoding the signal to obtain the incoming data.

In various embodiments, the credit processing controller 105 provides an interface to an electronic payment management system 190 such as an electronic wallet or the like. The electronic payment system provides credit account data that is used for generating incoming credit data as a credit input and outgoing credit data as a credit output.

Figure 2A:
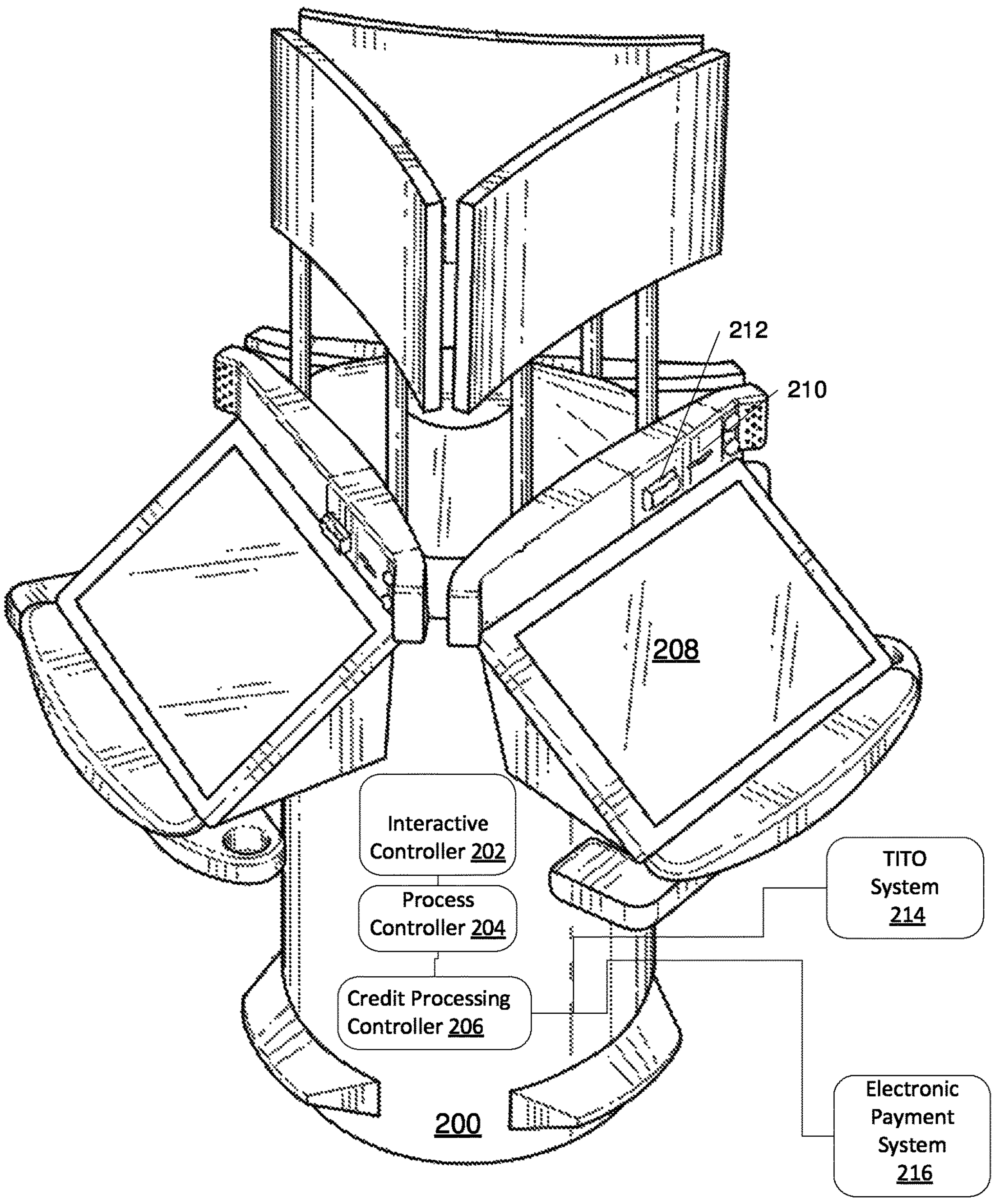
FIG. 2A is a diagram of an electronic gaming machine configuration of a variable skill objective wagering system in accordance with various embodiments of the invention.

FIG. 2A is a diagram of an electronic gaming machine configuration of a variable skill objective wagering system in accordance with various embodiments of the invention. Electronic gaming machine configurations of a variable skill objective wagering system include, but are not limited to, electronic gaming machines such as slot machines, table games, video arcade consoles and the like. An electronic gaming machine configuration of a variable skill objective wagering system 200 includes an interactive controller 202, a process controller 204 and a credit processing controller 206 contained in an enclosure such as a housing, cabinet, casing or the like. The enclosure may further include one or more player accessible openings or surfaces that may be used to mount one or more player accessible user input devices and user output devices 208, one or more player accessible credit input devices 210 and one or more credit output devices 212. The interactive controller 202 communicates with the user input devices to detect player interactions with the variable skill objective wagering system and commands and controls the user output devices to provide a user interface to one or more players of the variable skill objective wagering system as described herein. The process controller 204 communicates with the credit processing controller 206 or player credit processing devices 210 and 212 to transfer credits into and out of the variable skill objective wagering system as described herein.

In many embodiments, the process controller 204 is operatively connected to an external session sub-controller (not shown). The session sub-controller may provide session control for a wagering session or may provide services for management of a player account for the storage of player points, application credits and the like.

In various embodiments, the process controller 204 is operatively connected to the credit processing controller 206. In many embodiments, the credit processing controller 206 is operatively connected to one or more credit input devices 210 for generating incoming credit data from a credit input as described herein. The incoming credit data are communicated to the process controller 204. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, TITO tickets, rewritable cards, or the like; and bill validators and/or coin validators that receive and validate paper and/or coin currency or tokens.

In various embodiments, the credit processing controller 206 is operatively connected to the one or more credit output devices 212 for generating a credit output based on outgoing credit data communicated from the process controller 204. Credit outputs can include, but are not limited to, credit items used to transfer credits.

Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the credit processing controller 206 is operatively connected to, and communicates with, a TITO system 214 or the like to determine incoming credit data representing amounts of credits to be transferred into the variable skill objective wagering system 200 and to determine outgoing credit data representing amounts of credits to be transferred out of the variable skill objective wagering system 200. In operation, the credit processing controller 206 communicates with one of the one or more connected credit input devices 210, such as a bill validator/ticket scanner, used to scan a credit input in the form of a TITO ticket having indicia of credit account data of a credit account of the TITO system 214. The credit processing controller 206 communicates the credit account data to the TITO system 214. The TITO system 214 uses the credit account data to determine an amount of credits to transfer to the credit processing controller 206 of the variable skill objective wagering system 200. The TITO system 214 communicates the amount of credits to the credit processing controller 206. The credit processing controller 206 communicates the amount of credits as incoming credit data to the process controller 204 which credits one or more credit meters with the amount of credits so that the credits can be used when a player makes wagers using the variable skill objective wagering system 200.

In many embodiments, the credit processing controller 206 includes a bill validator/ticket scanner as one of the one or more credit input devices 210. The credit processing controller 206 communicates with the bill validator/ticket scanner to scan currency used as a credit input to determine an amount of credits as incoming credit data to transfer credit to one or more credit meters associated with one or more players. The process controller 204 credits the one or more credit meters with the amount of credits so that the credits can be used when a player makes wagers using the variable skill objective wagering system 200.

In some embodiments, the credit processing controller 206 can use the TITO system 214 along with a ticket or voucher printer as one of the one or more credit output devices 212 to generate a TITO ticket as a credit output for a player. In operation, the credit processing controller 206 communicates, as outgoing credit data, data of an amount of credits to be credited to a credit account on the TITO system 214. The TITO system 214 receives the amount of credits and creates the credit account and credits the credit account with the amount of credits. The TITO system 214 generates credit account data for the credit account and communicates the credit account data to the credit processing controller 206. The credit processing controller 206 uses the ticket or voucher printer to print indicia of the credit account data onto a TITO ticket as a credit output.

In various embodiments, the credit processing controller 206 provides an interface to an electronic payment system 216 such an electronic wallet or the like. The electronic payment system 216 provides credit account data that is used for generating incoming credit data as a credit input and outgoing credit data as a credit output.

In some embodiments, the process controller 204 is operatively connected to a central determination controller (not shown). In operation, when a wagering sub-controller of the process controller 204 needs to determine a random outcome, the wagering sub-controller communicates a request to the central determination controller for the random outcome. The central determination controller receives the random outcome request and generates a random outcome in response to the random outcome request. The central determination controller communicates data of the random outcome to the process controller 204. The processing controller 204 receives the data of the random outcome and utilizes the random outcome as described herein. In some embodiments, the random outcome is drawn from a pool of pre-determined random outcomes.

In various embodiments, the wagering process controller 204 may be operatively connected to a progressive controller along (not shown) with one or more other process controllers of one or more other variable skill objective wagering systems. The progressive controller provides services for the collection and provision of credits used by the process controller 204 to provide random outcomes that have a progressive or pooling component.

Figure 2B:
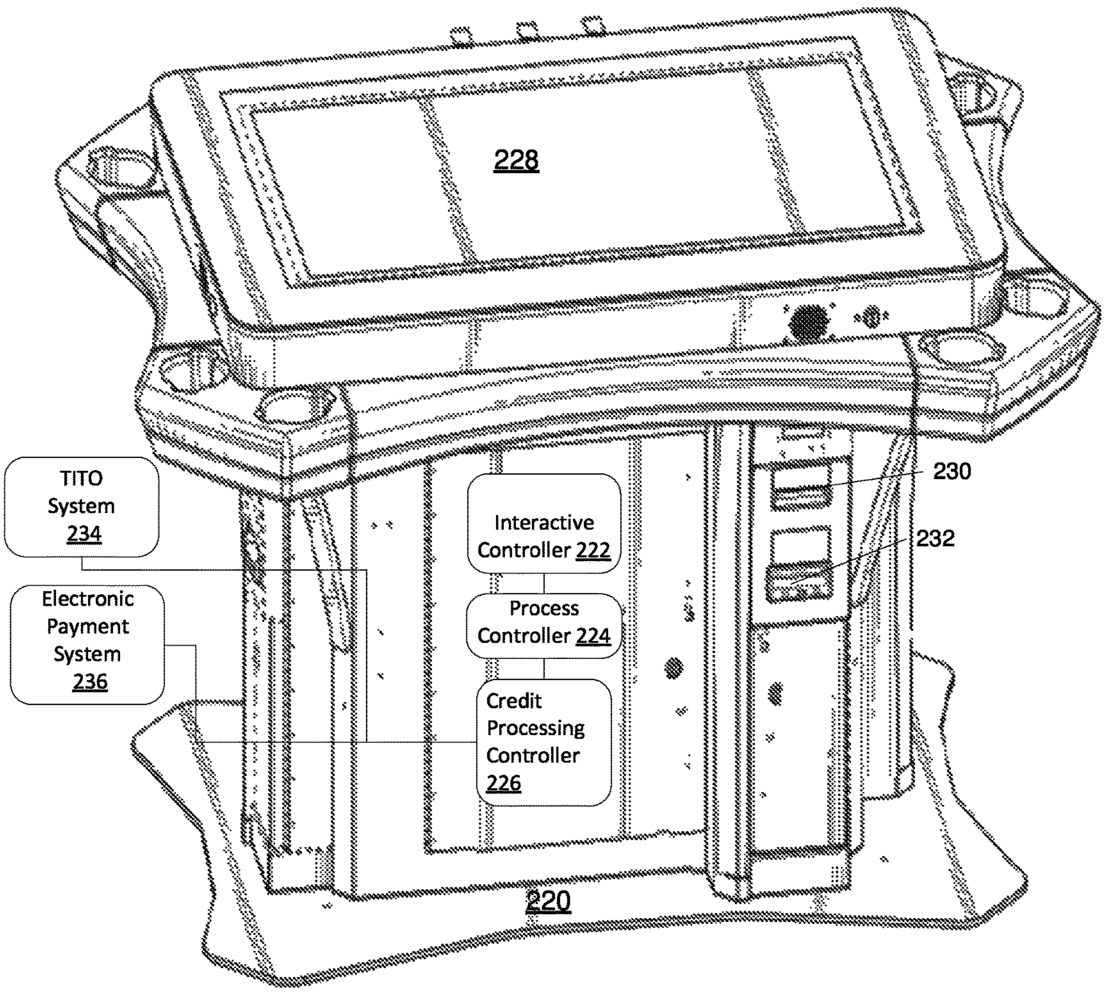
FIG. 2B is a diagram of a table electronic gaming machine configuration of a variable skill objective wagering system in accordance with various embodiments of the invention.

FIG. 2B is a diagram of multiplayer or multiplayer electronic gaming machine configuration of a variable skill objective wagering system in accordance with various embodiments of the invention. Types of a multiplayer or multiplayer electronic gaming machine configuration a variable skill objective wagering system include, but are not limited to, multiplayer or multiplayer electronic gaming machines, multiplayer or multiplayer slot machines, multiplayer or multiplayer table gaming devices, multiplayer or multiplayer video arcade consoles and the like. A multiplayer or multiplayer electronic gaming machine configuration of a variable skill objective wagering system 220 includes an interactive controller 222, a process controller 224 and a credit processing controller 226 contained in an enclosure such as a housing, cabinet, casing or the like. The enclosure may further include one or more player accessible openings or surfaces that may be used to mount one or more player accessible user input devices and user output devices 228, one or more player accessible credit input devices 230 and one or more player accessible credit output devices 212.

In some embodiments, two or more sets of credit input devices and credit output devices are provided so that each player of the multiplayer or multiplayer electronic gaming machine configuration of a variable skill objective wagering system 220 can have an associated set of credit input devices and credit output devices.

The interactive controller 222 communicates with the user input devices to detect player interactions with the variable skill objective wagering system and commands and controls the user output devices to provide a user interface to one or more players of the variable skill objective wagering system as described herein. The process controller 224 communicates with the credit processing controller 226 or player credit processing devices 230 and 232 to transfer credits into and out of the variable skill objective wagering system as described herein.

In many embodiments, the process controller 224 is operatively connected to an external session sub-controller (not shown). The session sub-controller may provide session control for a wagering session or may provide services for management of a player account for the storage of player points, application credits and the like.

In various embodiments, the process controller 224 is operatively connected to the credit processing controller 226. In many embodiments, the credit processing controller 226 is operatively connected to one or more credit input devices 230 for generating incoming credit data from a credit input as described herein. The incoming credit data are communicated to the process controller 224. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, TITO tickets, rewritable cards, or the like; and bill validators and/or coin validators that receive and validate paper and/or coin currency or tokens.

In various embodiments, the credit processing controller 226 is operatively connected to the one or more credit output devices 232 for generating a credit output based on outgoing credit data communicated from the process controller 224. Credit outputs can include, but are not limited to, credit items used to transfer credits. Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the credit processing controller 226 is operatively connected to, and communicates with, a TITO system 234 or the like to determine incoming credit data representing amounts of credits to be transferred into the variable skill objective wagering system 220 and to determine outgoing credit data representing amounts of credits to be transferred out of the variable skill objective wagering system 220. In operation, the credit processing controller 226 communicates with one of the one or more connected credit input devices 230, such as a bill validator/ticket scanner, used to scan a credit input in the form of a TITO ticket having indicia of credit account data of a credit account of the TITO system 234. The credit processing controller 226 communicates the credit account data to the TITO system 234. The TITO system 234 uses the credit account data to determine an amount of credits to transfer to the credit processing controller 226 of the variable skill objective wagering system 220. The TITO system 234 communicates the amount of credits to the credit processing controller 226. The credit processing controller 226 communicates the amount of credits as incoming credit data to the process controller 224 which credits one or more credit meters with the amount of credits so that the credits can be used when a player makes wagers using the variable skill objective wagering system 220.

In many embodiments, the credit processing controller 226 includes a bill validator/ticket scanner as one of the one or more credit input devices 230. The credit processing controller 226 communicates with the bill validator/ticket scanner to scan currency used as a credit input to determine an amount of credits as incoming credit data to transfer credit to one or more credit meters associated with one or more players. The process controller 224 credits the one or more credit meters with the amount of credits so that the credits can be used when a player makes wagers using the variable skill objective wagering system 220.

In some embodiments, the credit processing controller 226 can use the TITO system 234 along with a ticket or voucher printer as one of the one or more credit output devices 232 to generate a TITO ticket as a credit output for a player. In operation, the credit processing controller 226 communicates, as outgoing credit data, data of an amount of credits to be credited to a credit account on the TITO system 234. The TITO system 234 receives the amount of credits and creates the credit account and credits the credit account with the amount of credits. The TITO system 234 generates credit account data for the credit account and communicates the credit account data to the credit processing controller 226. The credit processing controller 226 uses the ticket or voucher printer to print indicia of the credit account data onto a TITO ticket as a credit output.

In various embodiments, the credit processing controller 226 provides an interface to an electronic payment system 236 such an electronic wallet or the like. The electronic payment system 236 provides credit account data that is used for generating incoming credit data as a credit input and outgoing credit data as a credit output.

In some embodiments, the process controller 224 is operatively connected to a central determination controller (not shown). In operation, when a wagering sub-controller of the process controller 224 needs to determine a random outcome, the wagering sub-controller communicates a request to the central determination controller for the random outcome. The central determination controller receives the random outcome request and generates a random outcome in response to the random outcome request. The central determination controller communicates data of the random outcome to the process controller 224. The processing controller 224 receives the data of the random outcome and utilizes the random outcome as described herein. In some embodiments, the random outcome is drawn from a pool of pre-determined random outcomes.

In various embodiments, the wagering process controller 224 may be operatively connected to a progressive controller along (not shown) with one or more other process controllers of one or more other variable skill objective wagering systems. The progressive controller provides services for the collection and provision of credits used by the process controller 224 to provide random outcomes that have a progressive or pooling component.

Figure 2C:
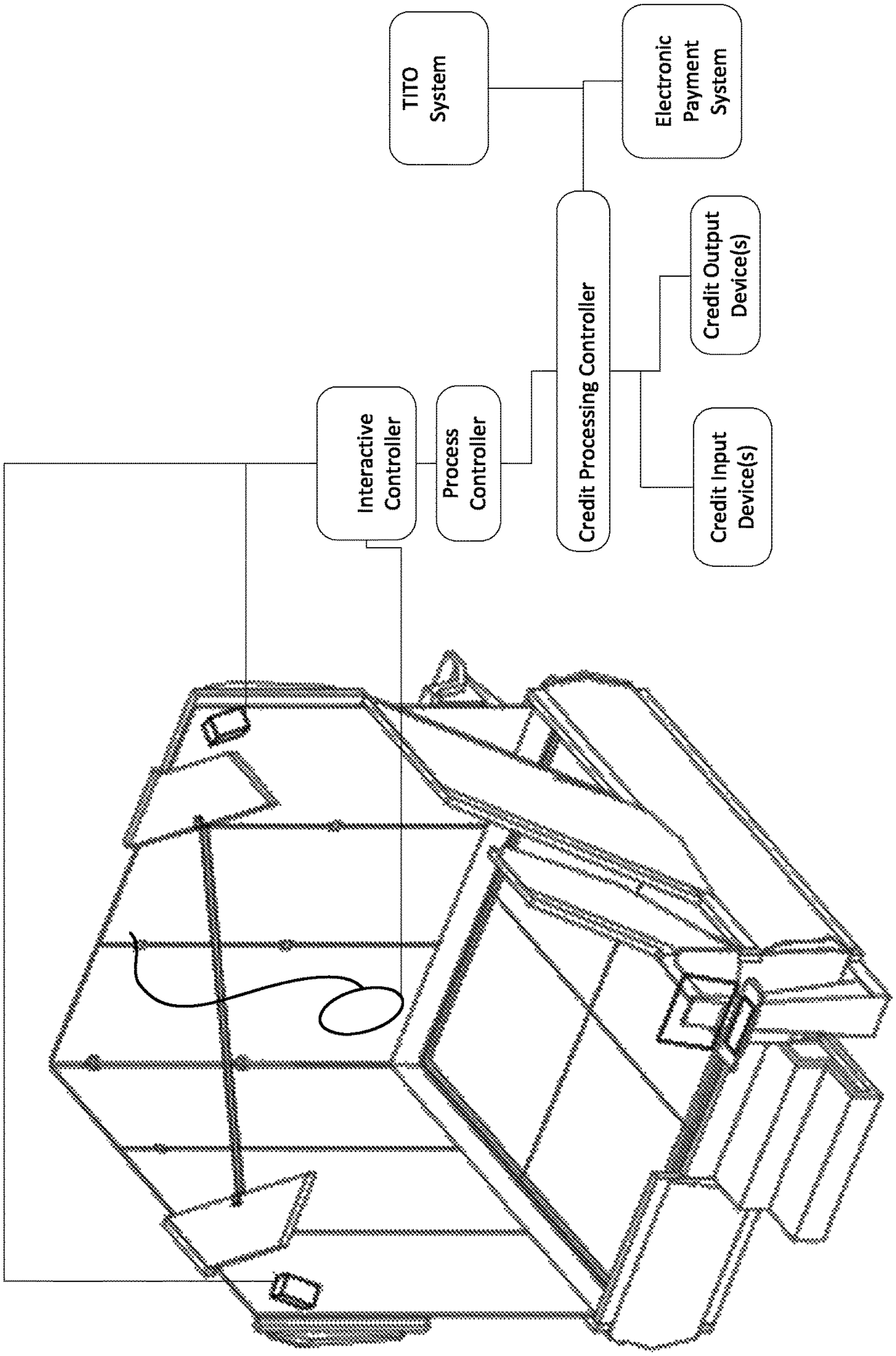
FIG. 2C is a diagram of a virtual reality gaming machine configuration of a variable skill objective wagering system in accordance with various embodiments of the invention.

FIG. 2C is a diagram of virtual reality gaming machine configuration of a variable skill objective wagering system in accordance with various embodiments of the invention. Types of a virtual reality gaming machine configuration of a variable skill objective wagering system include, but are not limited to, virtual reality gaming machines, virtual reality slot machines, virtual reality gaming devices, virtual reality arcade consoles and the like. A virtual reality gaming machine configuration of a variable skill objective wagering system includes an interactive controller, a process controller and a credit processing controller contained in an enclosure such as a housing, cabinet, casing or the like. The enclosure may further include one or more player accessible openings or surfaces that may be used to mount one or more player accessible user input devices and user output devices, one or more player accessible credit input devices and one or more player accessible credit output devices.

A virtual reality gaming machine configuration of a variable skill objective wagering system further includes a player area having virtual reality sensors for sensing player interactions and/or player movements within the player area, a player headset having a stereoscopic visual display for presentation of a stereoscopic presentation to a player, headphones for presenting a stereophonic sound presentation to a player, and one or more subwoofers for providing a hepatic or low frequency auditory presentation to the player.

The interactive controller communicates with the user input devices to detect player interactions with the virtual reality variable skill objective wagering system and commands and controls the user output devices to provide a user interface to one or more players of the virtual reality variable skill objective wagering system as described herein. The process controller communicates with the credit processing controller or player credit processing devices and to transfer credits into and out of the variable skill objective wagering system as described herein.

In many embodiments, the process controller is further connected to one or more side betting terminals that enable spectators of a player using the virtual reality variable skill objective wagering system to make side bets based on the performance of the player.

In many embodiments, the process controller is operatively connected to an external session sub-controller (not shown). The session sub-controller may provide session control for a wagering session or may provide services for management of a player account for the storage of player points, application credits and the like.

In various embodiments, the process controller is operatively connected to the credit processing controller. In many embodiments, the credit processing controller is operatively connected to one or more credit input devices for generating incoming credit data from a credit input as described herein. The incoming credit data are communicated to the process controller. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, TITO tickets, rewritable cards, or the like; and bill validators and/or coin validators that receive and validate paper and/or coin currency or tokens.

In various embodiments, the credit processing controller is operatively connected to the one or more credit output devices for generating a credit output based on outgoing credit data communicated from the process controller. Credit outputs can include, but are not limited to, credit items used to transfer credits. Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the credit processing controller is operatively connected to, and communicates with, a TITO system or the like to determine incoming credit data representing amounts of credits to be transferred into the variable skill objective wagering system and to determine outgoing credit data representing amounts of credits to be transferred out of the variable skill objective wagering system. In operation, the credit processing controller communicates with one of the one or more connected credit input devices, such as a bill validator/ticket scanner, used to scan a credit input in the form of a TITO ticket having indicia of credit account data of a credit account of the TITO system. The credit processing controller communicates the credit account data to the TITO system. The TITO system uses the credit account data to determine an amount of credits to transfer to the credit processing controller of the variable skill objective wagering system. The TITO system communicates the amount of credits to the credit processing controller. The credit processing controller communicates the amount of credits as incoming credit data to the process controller which credits one or more credit meters with the amount of credits so that the credits can be used when a player makes wagers using the variable skill objective wagering system.

In many embodiments, the credit processing controller includes a bill validator/ticket scanner as one of the one or more credit input devices. The credit processing controller communicates with the bill validator/ticket scanner to scan currency used as a credit input to determine an amount of credits as incoming credit data to transfer credit to one or more credit meters associated with one or more players. The process controller credits the one or more credit meters with the amount of credits so that the credits can be used when a player makes wagers using the variable skill objective wagering system.

In some embodiments, the credit processing controller can use the TITO system along with a ticket or voucher printer as one of the one or more credit output devices to generate a TITO ticket as a credit output for a player. In operation, the credit processing controller communicates, as outgoing credit data, data of an amount of credits to be credited to a credit account on the TITO system. The TITO system receives the amount of credits and creates the credit account and credits the credit account with the amount of credits. The TITO system generates credit account data for the credit account and communicates the credit account data to the credit processing controller. The credit processing controller uses the ticket or voucher printer to print indicia of the credit account data onto a TITO ticket as a credit output.

In various embodiments, the credit processing controller provides an interface to an electronic payment system such an electronic wallet or the like. The electronic payment system provides credit account data that is used for generating incoming credit data as a credit input and outgoing credit data as a credit output.

In some embodiments, the process controller is operatively connected to a central determination controller (not shown). In operation, when a wagering sub-controller of the process controller needs to determine a random outcome, the wagering sub-controller communicates a request to the central determination controller for the random outcome. The central determination controller receives the random outcome request and generates a random outcome in response to the random outcome request. The central determination controller communicates data of the random outcome to the process controller. The processing controller receives the data of the random outcome and utilizes the random outcome as described herein. In some embodiments, the random outcome is drawn from a pool of pre-determined random outcomes.

In various embodiments, the wagering process controller may be operatively connected to a progressive controller along (not shown) with one or more other process controllers of one or more other variable skill objective wagering systems. The progressive controller provides services for the collection and provision of credits used by the process controller to provide random outcomes that have a progressive or pooling component.

Figure 3:
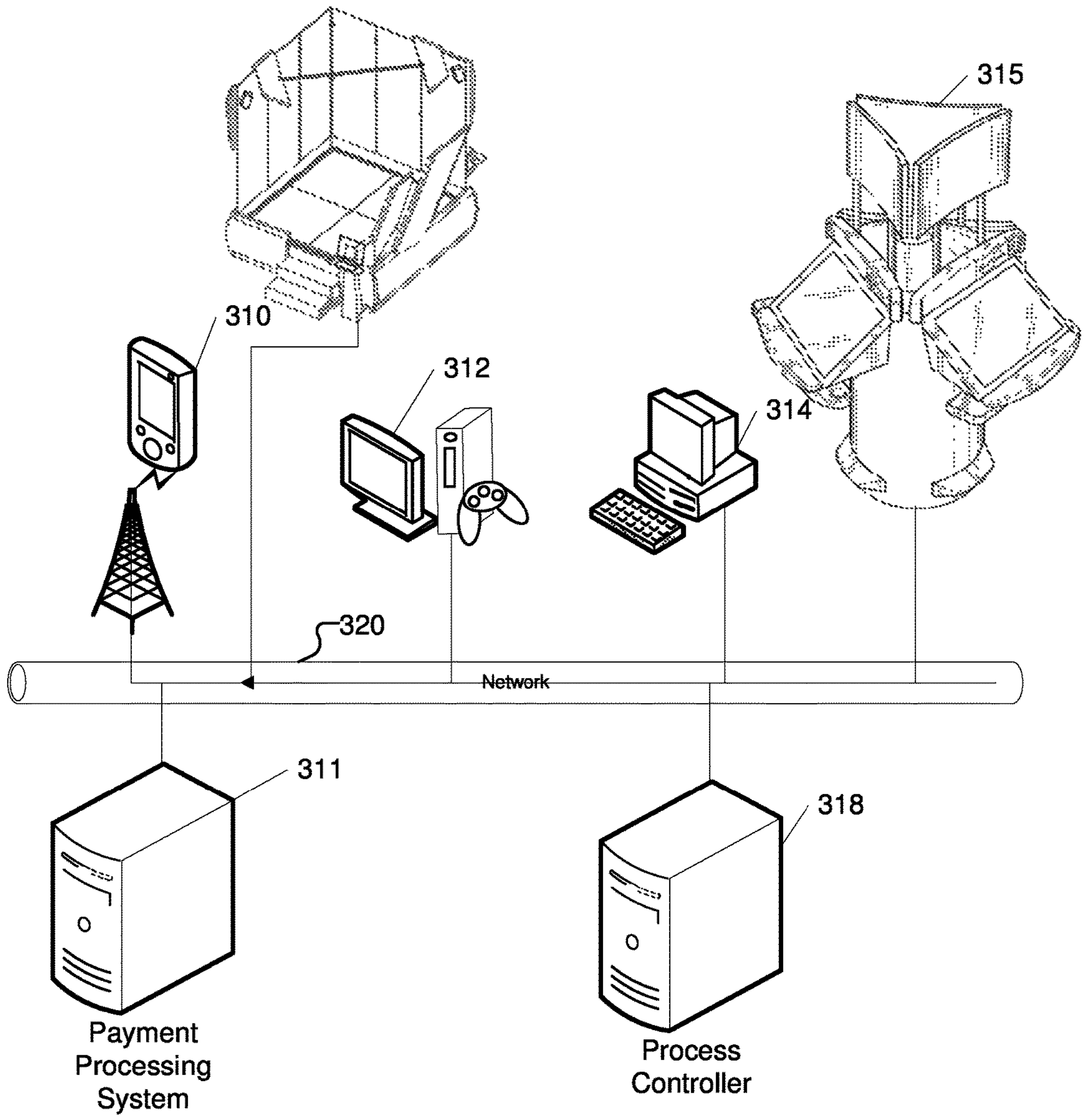
FIG. 3 is a diagram of distributed variable skill objective wagering systems in accordance with various embodiments of the invention.

FIG. 3 is a diagram of distributed variable skill objective wagering systems in accordance with various embodiments of the invention. An interactive controller, such as interactive controller 102 of FIG. 1, may be constructed from or configured using one or more processing devices that perform the operations of the interactive controller. An interactive controller in a distributed variable skill objective wagering system may be constructed from or configured using any processing device having sufficient processing and communication capabilities that may be that perform the processes of an interactive controller in accordance with various embodiments of the invention. In some embodiments, the construction or configuration of the interactive controller may be achieved through the use of an application control interface, such as application control interface 122 of FIG. 1, and/or through the use of an interactive application, such as interactive application 110 of FIG. 1.

In some embodiments, an interactive controller may be constructed from or configured using an electronic gaming machine 315, such as a slot machine or the like. The electronic gaming machine 315 may be physically located in various types of gaming establishments.

In many embodiments, an interactive controller may be constructed from or configured using a portable device 310. The portable device 310 is a device that may wirelessly connect to a network. Examples of portable devices include, but are not limited to, a tablet computer, a personal digital assistant, and a smartphone.

In some embodiments, an interactive controller may be constructed from or configured using a gaming console 312.

In various embodiments, an interactive controller may be constructed from or configured using a personal computer 314.

In some embodiments, one or more processing devices, such as devices 310, 312, 314, 315 and a virtual reality gaming machine may be used to construct a complete variable skill objective wagering system and may be operatively connected using a communication link to a session and/or management controller.

Some variable skill objective wagering systems in accordance with many embodiments of the invention can be distributed across a plurality of devices in various configurations. One or more interactive controllers of a distributed variable skill objective wagering system, such as but not limited to, a mobile or wireless device 310, a gaming console 312, a personal computer 314, an electronic gaming machine 315, and a virtual reality gaming machine are operatively connected with a process controller 318 of a distributed variable skill objective wagering system using a communication link 320. Communication link 320 is a communications link that allows processing systems to communicate with each other and to share data. Embodiments of a communication link include, but are not limited to: a wired or wireless interdevice communication link; a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, one or more processes of an interactive controller and a process controller as described herein are executed on the individual interactive controllers 310, 312, 314, 315 and a virtual reality gaming machine while one or more processes of a process controller as described herein can be executed by the process controller 318.

In many embodiments, a distributed variable skill objective wagering system and may be operatively connected using a communication link to a session controller (not shown), that performs the processes of a session controller as described herein.

In several embodiments, a distributed variable skill objective wagering system and may be operatively connected using a communication link to credit processing system 311, that performs the processes of one or more credit processing systems as described herein.

Figure 4A:
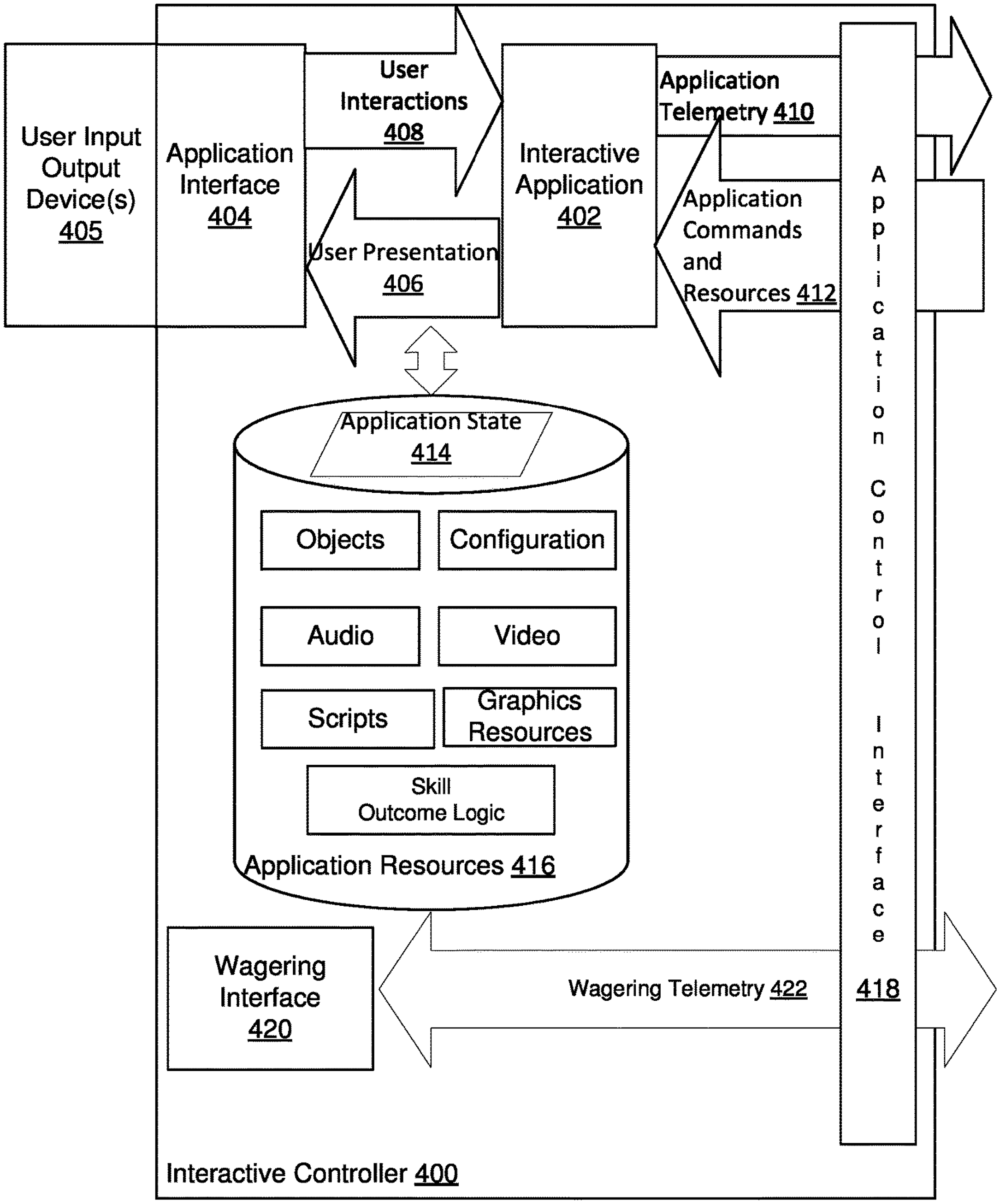
FIGS. 4A and 4B are diagrams of a structure of an interactive controller of a variable skill objective wagering system in accordance with various embodiments of the invention.

Referring now to FIG. 4A, an interactive controller 400, suitable for use as interactive controller 102 of FIG. 1, provides an execution environment for an interactive application 402 of a variable skill objective wagering system. In several embodiments, an interactive controller 400 of a variable skill objective wagering system provides an interactive application 402 that generates an application interface 404 for interaction with by a player. The interactive application 402 generates a player presentation 406 that is presented to the player through the application interface 404 using one or more user input and output devices 405. The player presentation 406 may include audio features, visual features or tactile features, or any combination of these features. In various embodiments, the application interface 404 utilizes one or more user interface input and output devices 405 so that a player can interact with the player presentation 406. In various embodiments, user interface input devices include, but are not limited to: buttons or keys; keyboards; keypads; game controllers; joysticks; computer mice; track balls; track buttons; touch pads; touch screens; accelerometers; motion sensors; video input devices; microphones; and the like. In various embodiments, user interface output devices include, but are not limited to: audio output devices such as speakers, headphones, earbuds, and the like; visual output devices such as lights, video displays and the like; and tactile devices such as rumble pads, hepatic touch screens, buttons, keys and the like. The player's interactions 408 are included by the interactive application 402 in application telemetry data 410 that is communicated by interactive controller 400 to various other components of a variable skill objective wagering system as described herein. The interactive application 402 receives application commands and resources 412 communicated from various other components of a variable skill objective wagering system as described herein. In some embodiments, the application telemetry data 410 may include player interactions with objects of the interactive application and a skill outcome for a skill proposition presented to the player by the interactive application 402.

In some embodiments, various components of the interactive application 402 can read data from an application state 414 in order to provide one or more features of the interactive application. In various embodiments, components of the interactive application 402 can include, but are not limited to: a physics engine; a rules engine; an audio engine; a graphics engine and the like. The physics engine is used to simulate physical interactions between virtual objects in the interactive application 402. The rules engine implements the rules of the interactive application and a random number generator that may be used for influencing or determining certain variables and/or outcomes to provide a randomizing influence on the operations of the interactive application. The graphics engine is used to generate a visual representation of the interactive application state to the player. The audio engine is used to generate an audio representation of the interactive application state to the player.

During operation, the interactive application reads and writes application resources 416 stored on a data store of the interactive controller host. The application resources 416 may include objects having graphics and/or control logic used to provide application environment objects of the interactive application. In various embodiments, the resources may also include, but are not limited to, video files that are used to generate a portion of the player presentation 406; audio files used to generate music, sound effects, etc. within the interactive application; configuration files used to configure the features of the interactive application; scripts or other types of control code used to provide various features of the interactive application; and graphics resources such as textures, objects, etc. that are used by a graphics engine to render objects displayed in an interactive application.

In operation, components of the interactive application 402 read portions of the application state 414 and generate the player presentation 406 for the player that is presented to the player using the user interface 404. The player perceives the player presentation and provides player interactions 408 using the user input devices. The corresponding player interactions are received as player actions or inputs by various components of the interactive application 402. The interactive application 402 translates the player actions into interactions with the virtual objects of the application environment stored in the application state 414. Components of the interactive application use the player interactions with the virtual objects of the interactive application and the interactive application state 414 to update the application state 414 and update the player presentation 406 presented to the player. The process loops continuously while the player interacts with the interactive application of the variable skill objective wagering system.

The interactive controller 400 provides one or more interfaces 418 between the interactive controller 400 and other components of a variable skill objective wagering system, such as, but not limited to, a process controller. The interactive controller 400 and the other variable skill objective wagering system components communicate with each other using the interface. The interface may be used to pass various types of data, and to communicate and receive messages, status data, commands and the like. In certain embodiments, the interactive controller 400 and a process controller communicate application commands and resources 412 and application telemetry data 410. In some embodiments, the communications include requests by the process controller that the interactive controller 400 update the application state 414 using data provided by the process controller.

In many embodiments, communications between a process controller and the interactive controller 400 includes a request that the interactive controller 400 update one or more resources 416 using data provided by the process controller. In a number of embodiments, the interactive controller 400 provides all or a portion of the application state to the process controller. In some embodiments, the interactive controller 400 may also provide data about one or more of the application resources 416 to the process controller. In some embodiments, the communication includes player interactions that the interactive controller 400 communicates to the process controller. The player interactions may be low level player interactions with the user interface 404, such as manipulation of an input device, or may be high level player interactions with game world objects as determined by the interactive application. The player interactions may also include resultant actions such as modifications to the application state 414 or game resources 416 resulting from the player's interactions taken in the variable skill objective wagering system interactive application. In some embodiments, player interactions include, but are not limited to, actions taken by entities such as non-player characters (NPCs) of the interactive application that act on behalf of or under the control of the player.

In various embodiments, the application commands and resources 412 include skill proposition application commands and/or resources used by the interactive application to generate a presentation of a skill proposition presented to a player and to determine a skill outcome based on the player's skillful interaction with the presentation of the skill proposition.

In some embodiments, the interactive controller 400 includes a wagering user interface 420 used to provide variable skill objective wagering system telemetry data 422 to and from the player. The variable skill objective wagering system telemetry data 422 from the variable skill objective wagering system includes, but is not limited to, data used by the player to configure credit, application credit and interactive element wagers, and data about the chance-based proposition credits, application credits and interactive element wagers such as, but not limited to, credit, application credit and interactive element balances and credit, application credit and interactive element amounts wagered.

In some embodiments, the interactive controller includes one or more sensors (not shown). Such sensors may include, but are not limited to, physiological sensors that monitor the physiology of the player, environmental sensors that monitor the physical environment of the interactive controller, accelerometers that monitor changes in motion of the interactive controller, and location sensors that monitor the location of the interactive controller such as global positioning sensors (GPSs). The interactive controller 400 communicates sensor telemetry data to one or more components of the variable skill objective wagering system.

Figure 4B:
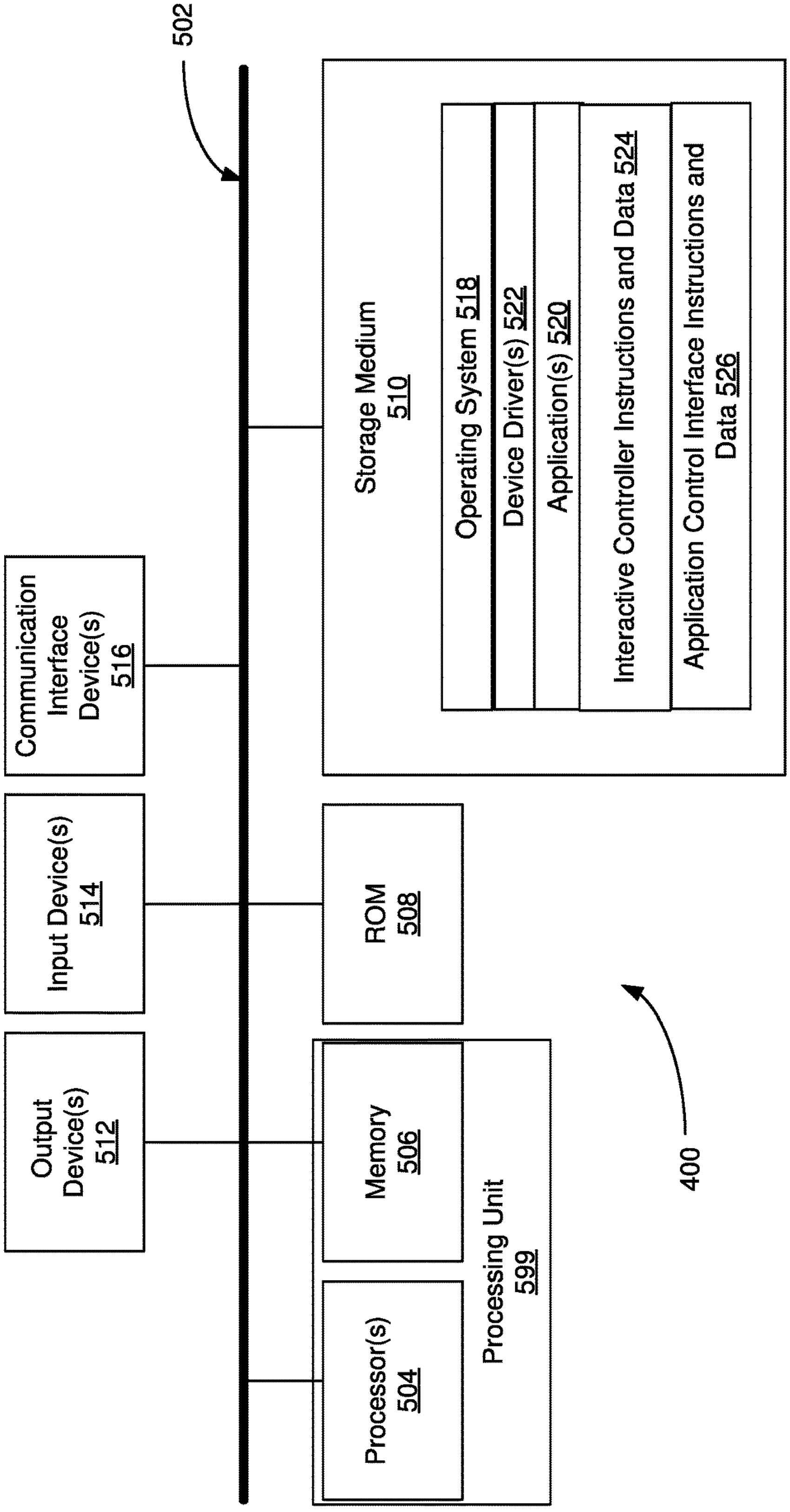

Referring now to FIG. 4B, interactive controller 400 includes a bus 502 that provides an interface for one or more processors 504, random access memory (RAM) 506, read only memory (ROM) 508, machine-readable storage medium 510, one or more user output devices 512, one or more user input devices 514, and one or more communication interface devices 516.

The one or more processors 504 may take many forms, such as, but not limited to: a central processing unit (CPU);

a multi-processor unit (MPU); an ARM processor; a controller; a programmable logic device; or the like.

In the example embodiment, the one or more processors 504 and the random access memory (RAM) 506 form an interactive controller processing unit 599. In some embodiments, the interactive controller processing unit includes one or more processors operatively connected to one or more of a RAM, ROM, and machine-readable storage medium; the one or more processors of the interactive controller processing unit receive instructions stored by the one or more of a RAM, ROM, and machine-readable storage medium via a bus; and the one or more processors execute the received instructions. In some embodiments, the interactive controller processing unit is an ASIC (Application-Specific Integrated Circuit). In some embodiments, the interactive controller processing unit is a SoC (System-on-Chip).

Examples of output devices 512 include, but are not limited to, display screens; light panels; and/or lighted displays. In accordance with particular embodiments, the one or more processors 504 are operatively connected to audio output devices such as, but not limited to: speakers; and/or sound amplifiers. In accordance with many of these embodiments, the one or more processors 504 are operatively connected to tactile output devices like vibrators, and/or manipulators.

Examples of user input devices 514 include, but are not limited to: tactile devices including but not limited to, keyboards, keypads, foot pads, touch screens, and/or trackballs; non-contact devices such as audio input devices; motion sensors and motion capture devices that the interactive controller can use to receive inputs from a player when the player interacts with the interactive controller; physiological sensors that monitor the physiology of the player; environmental sensors that monitor the physical environment of the interactive controller; accelerometers that monitor changes in motion of the interactive controller; and location sensors that monitor the location of the interactive controller such as global positioning sensors.

The one or more communication interface devices 516 provide one or more wired or wireless interfaces for communicating data and commands between the interactive controller 400 and other devices that may be included in a variable skill objective wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface, a cellular or satellite telephone network interface; and the like.

The machine-readable storage medium 510 stores machine-executable instructions for various components of the interactive controller, such as but not limited to: an operating system 518; one or more device drivers 522; one or more application programs 520 including but not limited to an interactive application; and variable skill objective wagering system interactive controller instructions and data 524 for use by the one or more processors 504 to provide the features of an interactive controller as described herein. In some embodiments, the machine-executable instructions further include application control interface/application control interface instructions and data 526 for use by the one or more processors 504 to provide the features of an application control interface/application control interface as described herein.

In various embodiments, the machine-readable storage medium 510 is one of a (or a combination of two or more of) a hard drive, a flash drive, a DVD, a CD, a flash storage, a solid state drive, a ROM, an EIEPROM, and the like.

In operation, the machine-executable instructions are loaded into memory 506 from the machine-readable storage medium 510, the ROM 508 or any other storage location. The respective machine-executable instructions are accessed by the one or more processors 504 via the bus 502, and then executed by the one or more processors 504. Data used by the one or more processors 504 are also stored in memory 506, and the one or more processors 504 access such data during execution of the machine-executable instructions. Execution of the machine-executable instructions causes the one or more processors 504 to control the interactive controller 400 to provide the features of a variable skill objective wagering system interactive controller as described herein.

Although the interactive controller is described herein as being constructed from or configured using one or more processors and instructions stored and executed by hardware components, the interactive controller can be constructed from or configured using only hardware components in accordance with other embodiments. In addition, although the storage medium 510 is described as being operatively connected to the one or more processors through a bus, those skilled in the art of interactive controllers will understand that the storage medium can include removable media such as, but not limited to, a USB memory device, an optical CD ROM, magnetic media such as tape and disks. In some embodiments, the storage medium 510 can be accessed by the one or more processors 504 through one of the communication interface devices 516 or using a communication link. Furthermore, any of the user input devices or user output devices can be operatively connected to the one or more processors 504 via one of the communication interface devices 516 or using a communication link.

In some embodiments, the interactive controller 400 can be distributed across a plurality of different devices. In many such embodiments, an interactive controller of a variable skill objective wagering system includes an interactive application server operatively connected to an interactive client using a communication link. The interactive application server and interactive application client cooperate to provide the features of an interactive controller as described herein.

In various embodiments, the interactive controller 400 may be used to construct other components of a variable skill objective wagering system as described herein.

In some embodiments, components of an interactive controller and a process controller of a variable skill objective wagering system may be constructed from or configured using a single device using processes that communicate using an interprocess communication protocol. In other such embodiments, the components of an interactive controller and a process controller of a variable skill objective wagering system may communicate by passing messages, parameters or the like.

Figure 5:
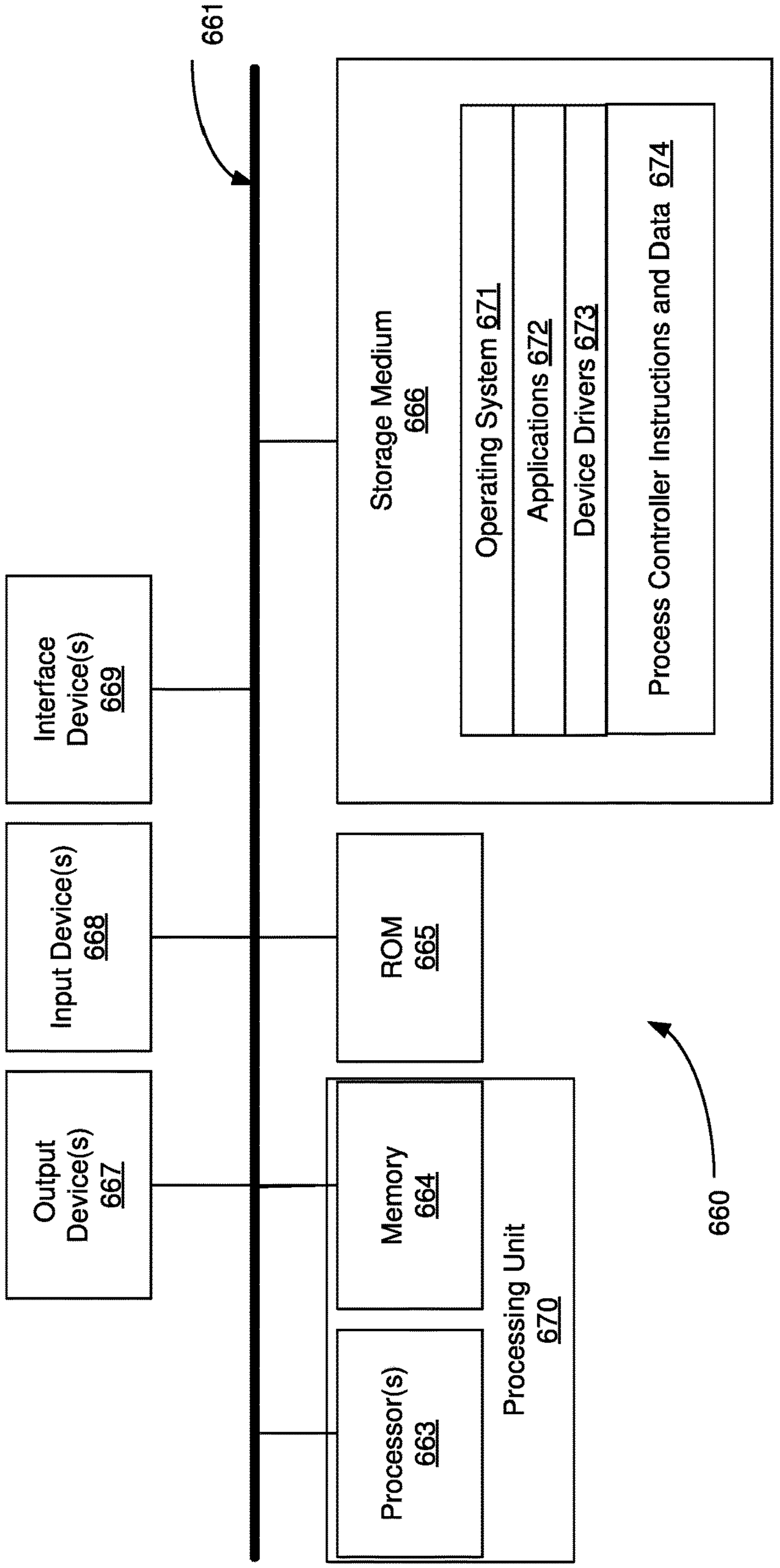
FIG. 5 is a diagram of a structure of a process controller of a variable skill objective wagering system in accordance with various embodiments of the invention.

FIG. 5 is a diagram of a structure of a process controller, suitable for use as process controller 104 of FIG. 1, of a variable skill objective wagering system in accordance with various embodiments of the invention. A process controller may be constructed from or configured using one or more processing devices that perform the operations of the process controller. In many embodiments, a process controller can be constructed from or configured using various types of processing devices including, but not limited to, a mobile device such as a smartphone, a personal digital assistant, a wireless device such as a tablet computer or the like, an electronic gaming machine such as a slot machine, a personal computer, a gaming console, a set-top box, a computing device, a controller, a server, or the like.

Process controller 660 includes a bus 661 providing an interface for one or more processors 663, random access memory (RAM) 664, read only memory (ROM) 665, machine-readable storage medium 666, one or more user output devices 667, one or more user input devices 668, and one or more communication interface and/or network interface devices 669.

The one or more processors 663 may take many forms, such as, but not limited to: a central processing unit (CPU); a multi-processor unit (MPU); an ARM processor; a programmable logic device; or the like.

Examples of output devices 667 include, include, but are not limited to: display screens; light panels; and/or lighted displays. In accordance with particular embodiments, the one or more processors 663 are operatively connected to audio output devices such as, but not limited to: speakers; and/or sound amplifiers. In accordance with many of these embodiments, the one or more processors 663 are operatively connected to tactile output devices like vibrators, and/or manipulators.

In the example embodiment, the one or more processors 663 and the random access memory (RAM) 664 form a process controller processing unit 670. In some embodiments, the process controller processing unit includes one or more processors operatively connected to one or more of a RAM, ROM, and machine-readable storage medium; the one or more processors of the process controller processing unit receive instructions stored by the one or more of a RAM, ROM, and machine-readable storage medium via a bus; and the one or more processors execute the received instructions. In some embodiments, the process controller processing unit is an ASIC (Application-Specific Integrated Circuit). In some embodiments, the process controller processing unit is a SoC (System-on-Chip).

Examples of user input devices 668 include, but are not limited to: tactile devices including but not limited to, keyboards, keypads, foot pads, touch screens, and/or trackballs; non-contact devices such as audio input devices; motion sensors and motion capture devices that the process controller can use to receive inputs from a player when the player interacts with the process controller 660.

The one or more communication interface and/or network interface devices 669 provide one or more wired or wireless interfaces for exchanging data and commands between the process controller 660 and other devices that may be included in a variable skill objective wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 666 stores machine-executable instructions for various components of the process controller 660 such as, but not limited to: an operating system 671; one or more applications 672; one or more device drivers 673; and variable skill objective wagering system process controller instructions and data 674 for use by the one or more processors 663 to provide the features of a process controller as described herein.

In various embodiments, the machine-readable storage medium 670 is one of a (or a combination of two or more of) a hard drive, a flash drive, a DVD, a CD, a flash storage, a solid state drive, a ROM, an EIEPROM, and the like.

In operation, the machine-executable instructions are loaded into memory 664 from the machine-readable storage medium 666, the ROM 665 or any other storage location. The respective machine-executable instructions are accessed by the one or more processors 663 via the bus 661, and then executed by the one or more processors 663. Data used by the one or more processors 663 are also stored in memory 664, and the one or more processors 663 access such data during execution of the machine-executable instructions. Execution of the machine-executable instructions causes the one or more processors 663 to control the process controller 660 to provide the features of a variable skill objective wagering system process controller as described herein.

Although the process controller 660 is described herein as being constructed from or configured using one or more processors and instructions stored and executed by hardware components, the process controller can be composed of only hardware components in accordance with other embodiments. In addition, although the storage medium 666 is described as being operatively connected to the one or more processors through a bus, those skilled in the art of process controllers will understand that the storage medium can include removable media such as, but not limited to, a USB memory device, an optical CD ROM, magnetic media such as tape and disks. Also, in some embodiments, the storage medium 666 may be accessed by processor 663 through one of the interfaces or using a communication link. Furthermore, any of the user input devices or user output devices may be operatively connected to the one or more processors 663 via one of the interfaces or using a communication link.

In various embodiments, the process controller 660 may be used to construct other components of a variable skill objective wagering system as described herein.

Figure 6:
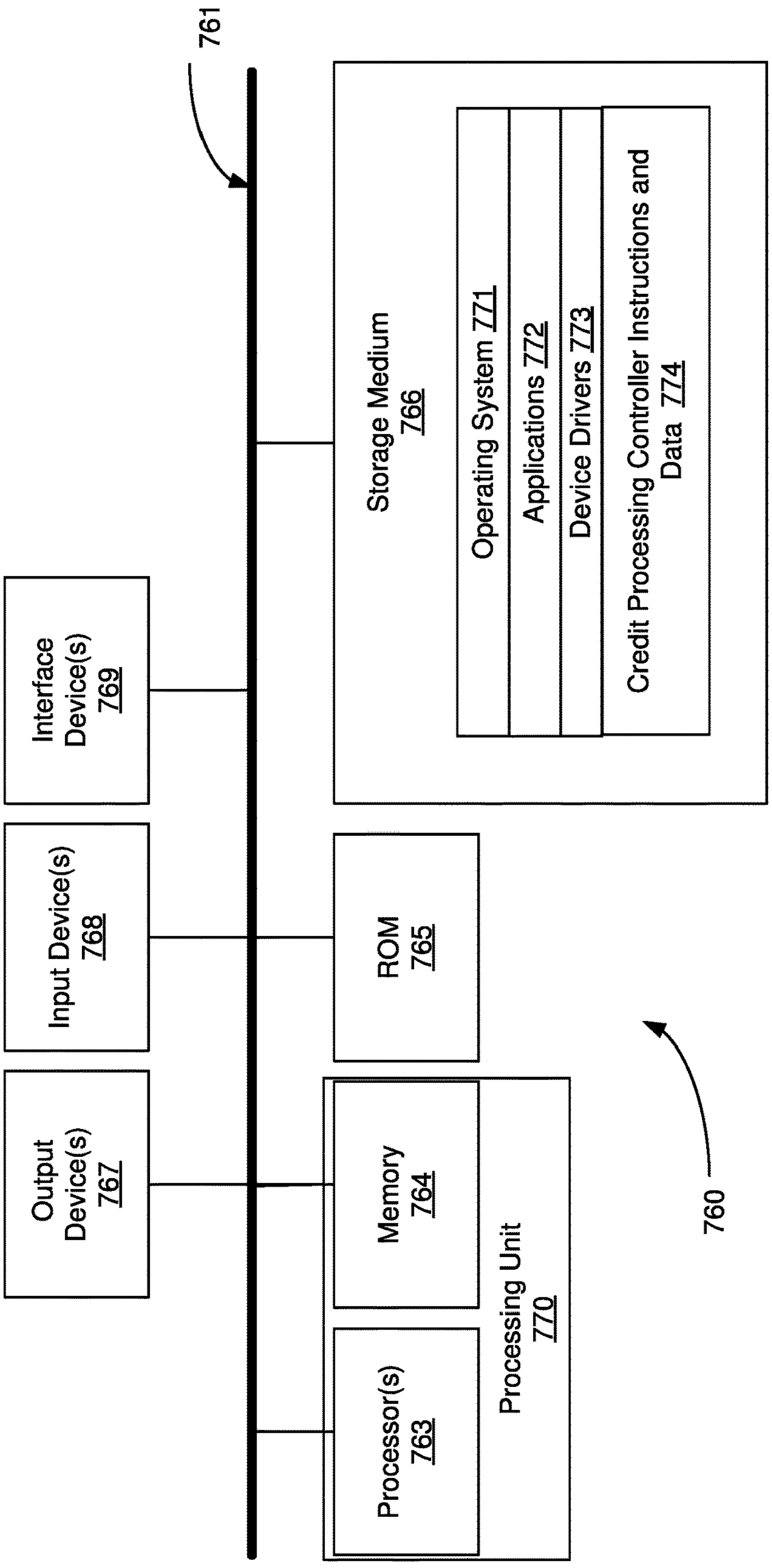
FIG. 6 is a diagram of a structure of a credit processing controller of a variable skill objective wagering system in accordance with various embodiments of the invention.

FIG. 6 is a diagram of a structure of a credit processing controller, suitable for use as credit processing controller 105 of FIG. 1, of a variable skill objective wagering system in accordance with various embodiments of the invention. A credit processing controller may be constructed from or configured using one or more processing devices that perform the operations of the credit processing controller. In many embodiments, a credit processing controller can be constructed from or configured using various types of processing devices including, but not limited to, a mobile device such as a smartphone, a personal digital assistant, a wireless device such as a tablet computer or the like, an electronic gaming machine such as a slot machine, a personal computer, a gaming console, a set-top box, a computing device, a controller, a server, or the like.

Credit processing controller 760 includes a bus 761 providing an interface for one or more processors 763, random access memory (RAM) 764, read only memory (ROM) 765, machine-readable storage medium 766, one or more user output devices 767, one or more user input devices 768, and one or more communication interface and/or network interface devices 769.

The one or more processors 763 may take many forms, such as, but not limited to: a central processing unit (CPU); a multi-processor unit (MPU); an ARM processor; a programmable logic device; or the like.

Examples of output devices 767 include, include, but are not limited to: display screens; light panels; and/or lighted displays. In accordance with particular embodiments, the one or more processors 763 are operatively connected to audio output devices such as, but not limited to: speakers; and/or sound amplifiers. In accordance with many of these embodiments, the one or more processors 763 are operatively connected to tactile output devices like vibrators, and/or manipulators.

In the example embodiment, the one or more processors 763 and the random access memory (RAM) 764 form a credit processing controller processing unit 770. In some embodiments, the credit processing controller processing unit includes one or more processors operatively connected to one or more of a RAM, ROM, and machine-readable storage medium; the one or more processors of the credit processing controller processing unit receive instructions stored by the one or more of a RAM, ROM, and machine-readable storage medium via a bus; and the one or more processors execute the received instructions. In some embodiments, the credit processing controller processing unit is an ASIC (Application-Specific Integrated Circuit). In some embodiments, the credit processing controller processing unit is a SoC (System-on-Chip).

Examples of user input devices 768 include, but are not limited to: tactile devices including but not limited to, keyboards, keypads, foot pads, touch screens, and/or trackballs; non-contact devices such as audio input devices; motion sensors and motion capture devices that the credit processing controller can use to receive inputs from a player when the player interacts with the credit processing controller 760.

The one or more communication interface and/or network interface devices 769 provide one or more wired or wireless interfaces for exchanging data and commands between the credit processing controller 760 and other devices that may be included in a variable skill objective wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 766 stores machine-executable instructions for various components of the credit processing controller 760 such as, but not limited to: an operating system 771; one or more applications 772; one or more device drivers 773; and credit processing controller instructions and data 774 for use by the one or more processors 763 to provide the features of a credit processing controller as described herein.

In various embodiments, the machine-readable storage medium 770 is one of a (or a combination of two or more of) a hard drive, a flash drive, a DVD, a CD, a flash storage, a solid state drive, a ROM, an EIEPROM, and the like.

In operation, the machine-executable instructions are loaded into memory 764 from the machine-readable storage medium 766, the ROM 765 or any other storage location. The respective machine-executable instructions are accessed by the one or more processors 763 via the bus 761, and then executed by the one or more processors 763. Data used by the one or more processors 763 are also stored in memory 764, and the one or more processors 763 access such data during execution of the machine-executable instructions. Execution of the machine-executable instructions causes the one or more processors 763 to control the credit processing controller 760 to provide the features of a variable skill objective wagering system credit processing controller as described herein.

Although the credit processing controller 760 is described herein as being constructed from or configured using one or more processors and instructions stored and executed by hardware components, the credit processing controller can be composed of only hardware components in accordance with other embodiments. In addition, although the storage medium 766 is described as being operatively connected to the one or more processors through a bus, those skilled in the art of credit processing controllers will understand that the storage medium can include removable media such as, but not limited to, a USB memory device, an optical CD ROM, magnetic media such as tape and disks. Also, in some embodiments, the storage medium 766 may be accessed by processor 763 through one of the interfaces or using a communication link. Furthermore, any of the user input devices or user output devices may be operatively connected to the one or more processors 763 via one of the interfaces or using a communication link.

In various embodiments, the credit processing controller 760 may be used to construct other components of a variable skill objective wagering system as described herein.

Figure 7:
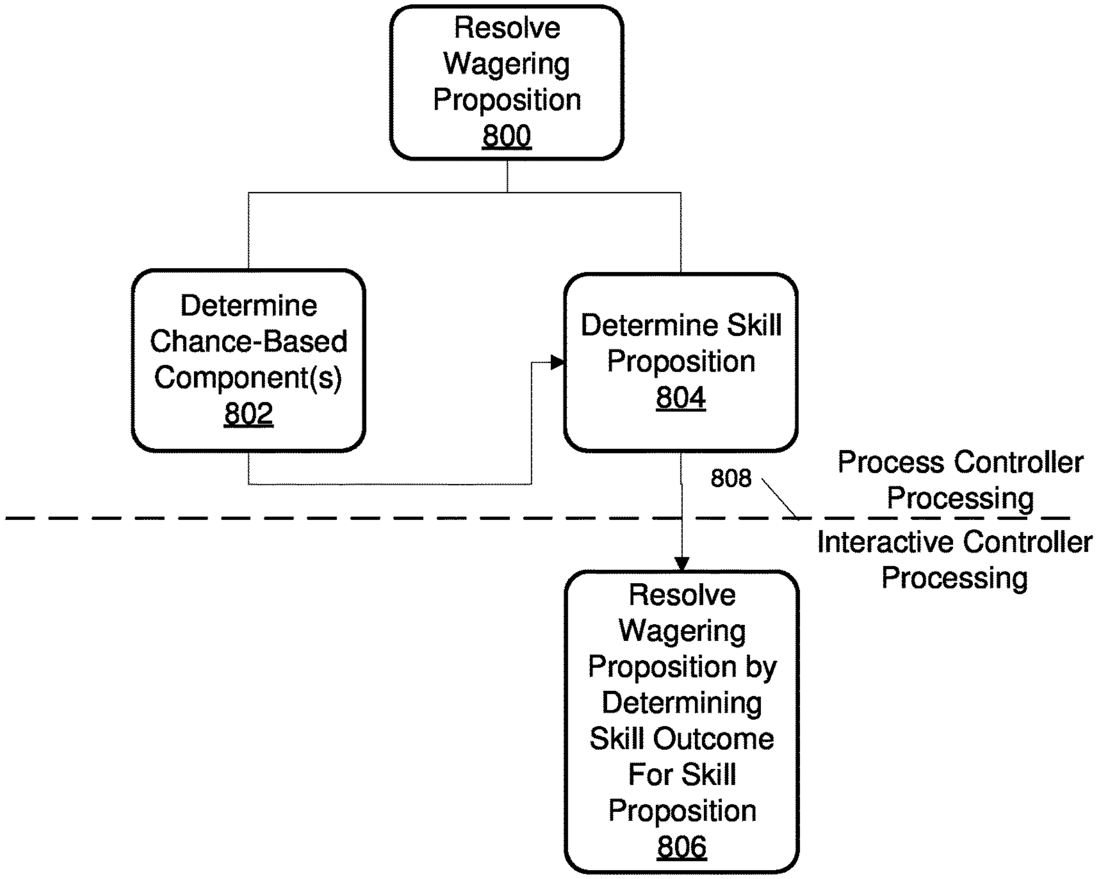
FIG. 7 is a block diagram of a process of a variable skill objective wagering system in accordance with various embodiments of the invention.

FIG. 7 is a block diagram of a process of a variable skill objective wagering system during a wagering session in accordance with various embodiments of the invention. A variable skill objective wagering system resolves 800 a wager proposition by determining 802 one or more random outcomes. The one or more random outcomes are then used to determine 804 one or more skill objectives of a skill proposition that will be presented to one or more players. The wager is resolved 806 by determining a skill outcome for the one or more skill objectives of the skill proposition.

In some embodiments, as indicated by dashed line 808, a process controller of the variable skill objective wagering system performs processing for determining 802 the skill objective and determining 804 the skill proposition while an interactive controller performs processing for determining 806 the skill outcome.

Figure 8:
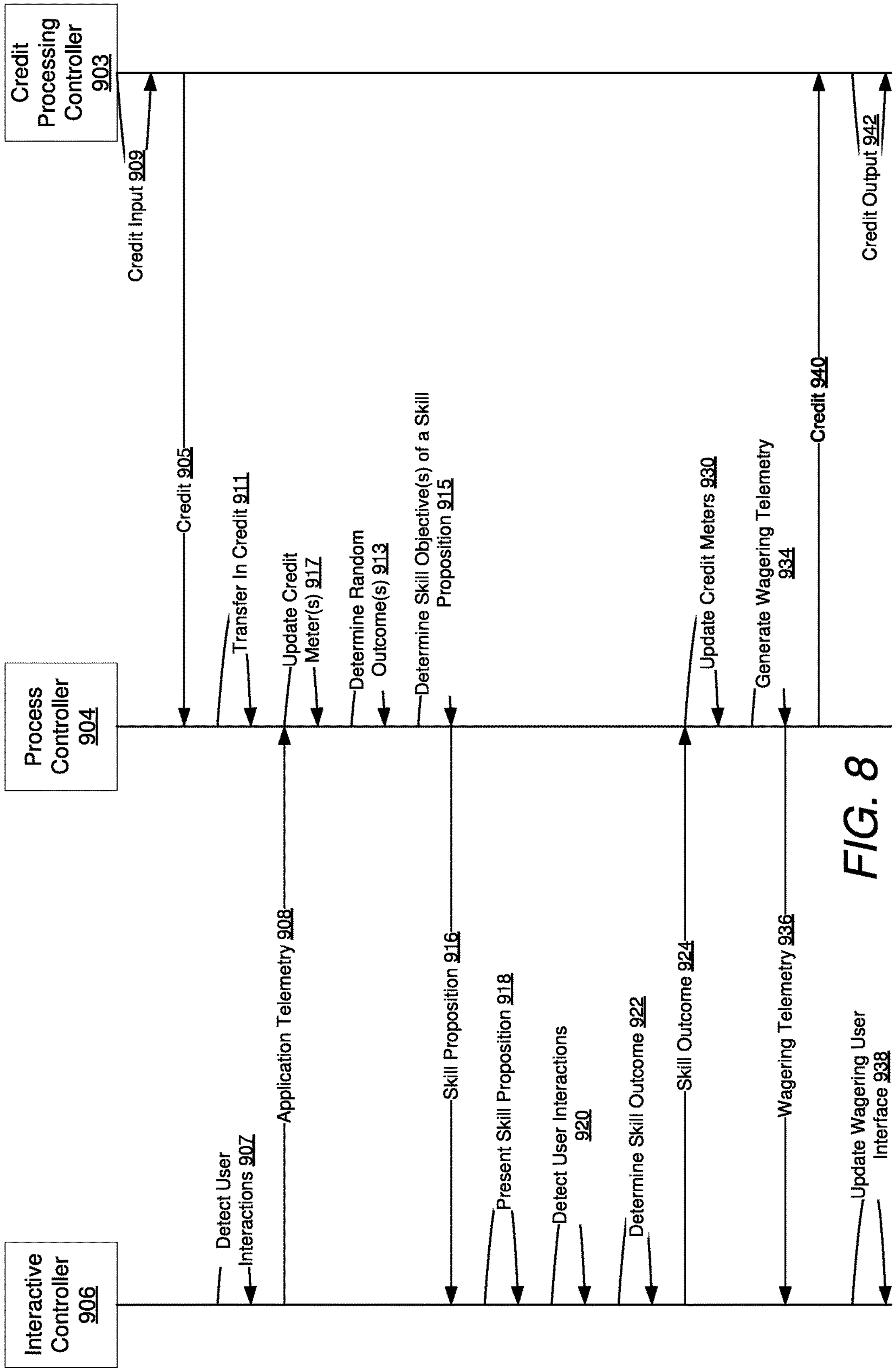
FIG. 8 is a sequence diagram of interactions between components of a variable skill objective wagering system in accordance with various embodiments of the invention.

FIG. 8 is a sequence diagram of interactions between components of a variable skill objective wagering system during a wagering session in accordance with various embodiments of the invention. The components of the variable skill objective wagering system include a process controller 904, such as process controller 104 of FIG. 1, an interactive controller 906, such as interactive controller 102 of FIG. 1, and a credit processing controller 903, such as credit processing controller 105 of FIG. 1.

In some embodiments, at a beginning of the wagering session, the process includes a credit input 909 to the variable skill objective wagering system with process controller 904 communicating with the credit processing controller 903 to receive incoming credit data 905. The process controller 904 uses the incoming credit data to transfer 911 credits onto one or more player credit meters associated with one or more players of the variable skill objective wagering system, thus transferring credits into the variable skill objective wagering system and on to the one or more player credit meters.

In many embodiments, the interactive controller 906 detects 907 one or more players performing a player interaction in an application interface of an interactive application provided by the interactive controller 906. The interactive controller 906 communicates application telemetry data 908 to the process controller 904. The application telemetry data 908 includes, but is not limited to, the player interaction detected by the interactive controller 906.

The process controller 904 receives the application telemetry data 908. Upon determination by the process controller 904 that the player interaction indicates a wagering event in accordance with a wagering proposition, the process controller 904 updates 917 one or more credit meters associated with one or more players as a commitment of an amount of credit to the wager and determines 913 one or more random outcomes and uses the one or more random outcomes to determine 915 one or more skill propositions of a wagering proposition. The process controller 904 communicates data of the skill proposition 916 including the one or more skill objectives to the interactive controller 906.

The interactive controller 906 receives the skill proposition data 916 from the process controller 904 and uses the skill proposition data 916 to generate and present 918 to the one or more players a skill proposition. The presentation of the skill proposition is presented to the one or more players in a user interface of the interactive application of the interactive controller 906. The interactive controller 906 detects 920 player interactions of the one or more players with the presentation of the skill proposition and determines 922 a skill outcome for the one or more skill objectives of the skill proposition based on the detected player interactions and the skill proposition data 916. The skill outcome includes data of whether or not a player has been able to achieve one or more of the one or more skill objectives of the skill proposition. The interactive controller 906 communicates data of the skill outcome 924 to the process controller 904.

The process controller 904 receives the skill outcome data 924 and resolves the wagering proposition using the skill outcome of the skill proposition and determines a wager outcome for the wagering proposition. The process controller updates 930 the one or more player credit meters associated with the one or more players based on the wager outcome for the wagering proposition, such as by incrementing an amount of credit to, or decrementing an amount of credit from, the one or more player credit meters.

The process controller 904 generates 934 wagering telemetry data 936 using the skill outcome data 924 and data of the updated one or more credit meters. The process controller 904 communicates the wagering telemetry data 936 to the interactive controller 906. The interactive controller 906 receives the wagering telemetry data 936 and the interactive controller 906 updates 936 a wagering user interface on a partial basis of the wagering telemetry data 936.

In many embodiments, upon determining that the wagering session is completed, such as by receiving a cashout communication from one or more players of the variable skill objective wagering system, the process controller 904 transfers credits off of the one or more player credit meters, generates outgoing credit data 940 on the basis of the credits transferred off of the one or more player credit meters, and communicates the outgoing credit data 940 to the credit processing controller 903. The credit processing controller receives the outgoing credit data 940 and generates 942 a credit output as described herein, thus transferring credits off of the one or more player credit meters and out of the variable skill objective wagering system.

In some embodiments, at a beginning of the wagering session, the process includes an application credit input to the variable skill objective wagering system with the process controller 904 communicating with the credit processing controller 903 to receive incoming application credit data. The process controller 902 uses the incoming application credit data to transfer application credits onto one or more application credit meters associated with one or more players of the variable skill objective wagering system, thus transferring application credits into the variable skill objective wagering system and on to the one or more application credit meters. The process controller 904 uses the skill outcome data 924 to determine an amount of application credit to award to a player based on the player's skillful interactions with an interactive application executed by the interactive controller 905. Upon determining that the wagering session is completed, such as by receiving a cashout communication from one or more players of the variable skill objective wagering system, the process controller 904 transfers application credits off of the one or more application credit meters, generates outgoing application credit data on the basis of the application credits transferred off of the one or more application credit meters, and communicates the outgoing application credit data to the credit processing controller 903. The credit processing controller receives the outgoing application credit data and generates an application credit output as described herein, thus transferring application credits off of the one or more application credit meters and out of the variable skill objective wagering system.

In some embodiments, the credit meters associated with the players are only updated after the skill outcome is determined.

Figure 9:
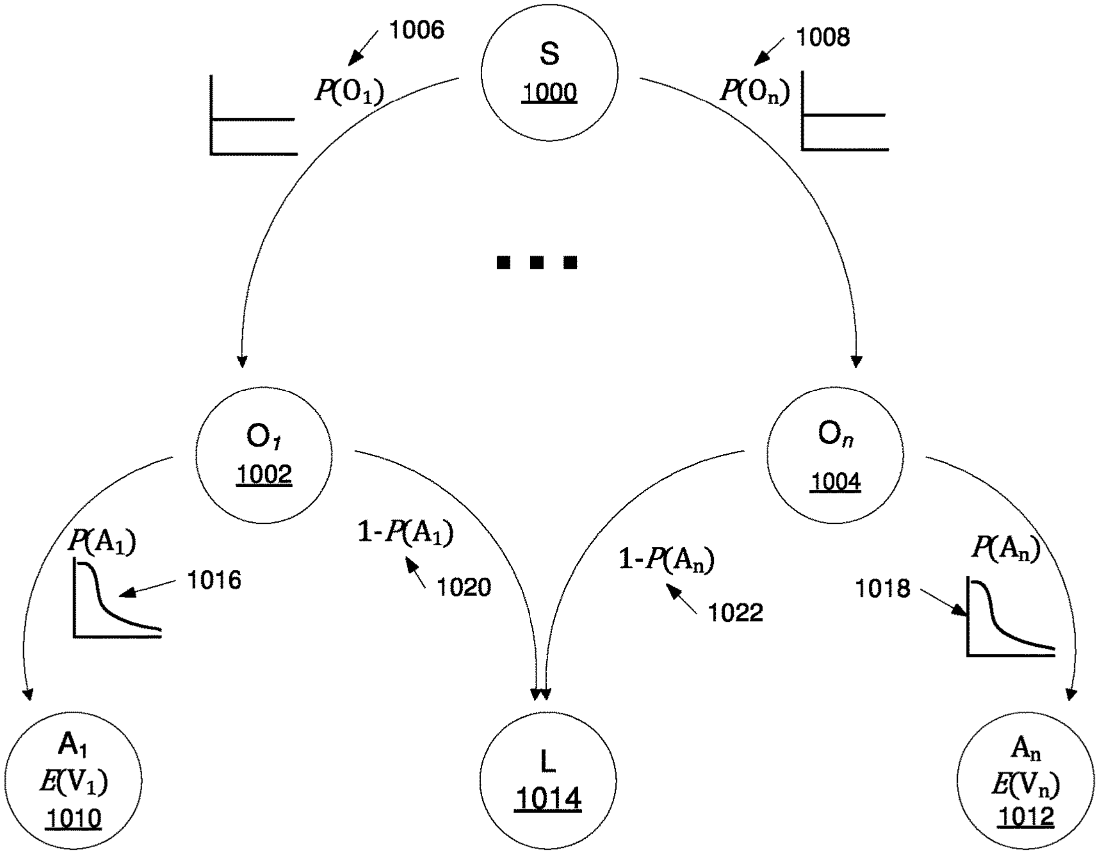
FIG. 9 is a state diagram illustrating a wagering process of a variable skill objective wagering system in accordance with various embodiments of the invention.

FIG. 9 is a state diagram illustrating a wagering process of a variable skill objective wagering system in accordance with various embodiments of the invention. The state diagram illustrates a process whereby skill objectives having specified wager outcomes are selected on the basis of a random outcome of a random number generator. In the process, at an initial state S 1000, a process controller, such as process controller 104 of FIG. 1, uses one or more random number generators, such random number generators 138 of FIG. 1, to generate a random outcome. On the basis of the random outcome, the process controller selects one or more skill objectives for a skill-based game being provided to a player by an interactive controller, such as interactive controller 102 of FIG. 1, from a plurality of skill objectives, as indicated by skill objective states $O_1$ 1002 to $O_n$ 1004. The random number generator generates a random outcome that has a known distribution, and the skill objectives are determined by selecting a skill objective by mapping the random outcome to one or mores skill objectives, as indicated by probabilities $P(O_1)$ 1006 and $P(O_n)$ 1008. Accordingly, each skill objective, Oi, has a probability of being selected and presented to the one or more players of $P(O_i)$. Each skill objective has an associated specified award having a specified value that will be awarded to a player if the player achieves the skill objective. In many embodiments, the value of the specified award is not determined on the basis of the random outcome, but instead the skill objective is determined on the basis of the random outcome. Furthermore, the player uses skillful play of the skill-based game to achieve the skill objective in order to earn the specified award associated with the skill objective. That is, the player is not awarded the specified award simply because the skill objective has been presented to the player; instead, the player achieves the skill objective in order to be awarded the specified award.

During the player's skillful play of the skill-based game, the one or more skill objectives are provided to the player within the context of the skill-based game as described herein. If the player achieves a skill objective, then the player is awarded the specified award associated with that skill objective, as indicated by skill objective achievement states $A_1$ 1010 to $A_n$ 1012. If the player is unable to achieve a skill objective, then the player is not awarded anything, resulting in a loss, as indicated by loss state L 1014.

The probability that a player will be presented with a particular skill objective is determined by the probability of a particular random outcome and the lookup table mapping a range of random outcomes to that particular skill objective. The probability that a player will achieve the particular skill objective can be determined from a probability distribution determined from historical player data collected as the players or players attempt to achieve the particular skill objective, as indicated by probabilities $P(A_1)$ 1016 and $P(A_n)$ 1018. The probability that the player will not achieve the skill objective is the compliment of the probability that the player will achieve the skill objective, as indicated by the probabilities $1-P(A_1)$ 1020 and $1-P(A_n)$ 1022.

Accordingly, the probability that the player will achieve a particular skill objective is a function of both the probability that the particular skill objective is determined by the process controller and the probability that the player can achieve the skill objective through skillful play of the skill-based game. Therefore, the expectation value of a player for a given skill objective and associated specified award is given by:

$$E(V_i)=P(O_i)\times P(A_i)\times R_i,\text{ where:}$$

$E(V_i)$=Expectation value.

$P(O_i)$=Probability that the ith skill objective is determined and provided to the player.

$P(A_i)$=Probability that player will achieve the ith skill objective.

$R_i$=Value of the ith specified award.

Additionally, the expectation value for the player of during skillful play of the skill-based game is given by:

$E(V)=\Sigma N_{i=1}{}^{N}E(Vi)$, where E(V) is the expectation value for the player.

It can be seen by inspection that the upper bound of the expectation value for a particular skill objective is determined by the probability that the skill objective is determined by the process controller on the basis of a random outcome and a specified award associated with the determined skill objective. That is, as $P(A_i)\Rightarrow 1$, $E(Vi)\Rightarrow P(O_i)\times R_i$. In other words, the maximum payout to the player for perfect play of the skill-based game is determined by the random outcome and the mapping of the random outcome to skill objectives and associated specified awards.

During operation, a variable skill objective wagering system implements a stateful process or protocol in order to implement a variable skill objective wagering process. In an example embodiment, the skill objective wagering system enters initial state S 1000 and generates one or more skill objectives based on a random outcome, and transitions, as indicated by probabilities $P(O_1)$ 1006 and $P(O_n)$ 1008, from initial state S to one or more of skill objective states $O_1$ 1002 to $O_n$ 1004 in accordance with the generated skill objective. The variable skill objective wagering system transitions, as indicated by probabilities $P(A_1)$ 1016 and $P(A_n)$ 1018, from the one or more skill objective states to the one or more achievement states $A_1$ 1010 to $A_n$ 1012 based on the variable skill objective wagering system determining that the player has achieved a respective skill objective. In many embodiments, the stateful process or protocol includes determining a commitment of an amount of credit to a wager at the initial state S 1000, and determining an award of an amount of credits for the wager while in an achievement state.

In some embodiments, the known distribution of the random outcome is a uniform distribution. In other embodiments, the known distribution of the random outcome is a normal distribution.

In various embodiments, a lookup table is used to map the random outcome to a selected skill objective.

In many embodiments, the probability distribution of the probability of the player achieving a skill objective can be described using a cumulative distribution.

In some embodiments, an amount of credits is specified based on a gaming parameter for one or more skill objectives during a wagering session as a specified award for the one or more skill objectives. In example embodiments, gaming parameters may include, but are not limited to, an amount of credits committed in a wager, an identity of a player, an amount of time that the player has been playing a skill-based game, an amount of credits wagered over time, a location of an electronic gaming machine, etc.

In some embodiments, an amount of credits is fixed for one or more skill objectives as a specified award for the one or more skill objectives.

In some embodiments, an amount of credits for a specified award of a skill objective is specified based on a random outcome.

Figure 10:
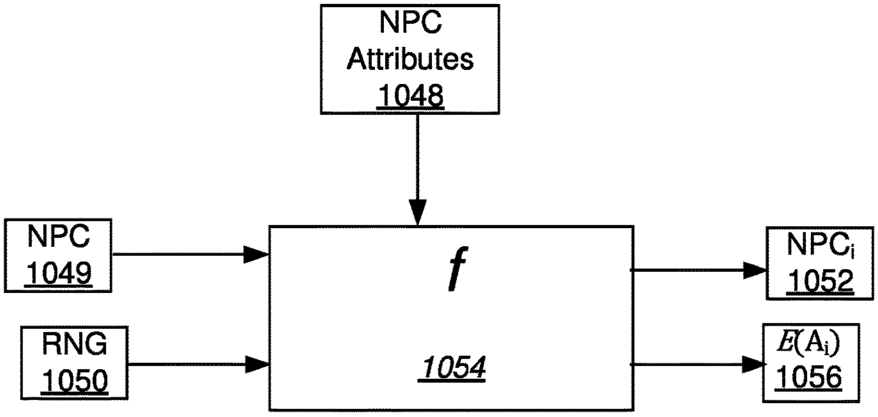
FIG. 10 is a depiction of a non-player character configuration process in accordance with various embodiments of the invention.

FIG. 10 is a depiction of a non-player character configuration process in accordance with various embodiments of the invention. In some embodiments, a skill-based game provided by an interactive application executed by an interactive controller includes one or more non-player characters (NPCs). A player attempts to achieve a skill objective of successfully interacting with the non-player characters. The non-player characters are implemented using a set of artificial intelligence NPC attributes 1048 that are associated with an NPC template 1049 and that are configurable based on a random outcome. The artificial intelligence NPC attributes provide for various behaviors of one or more non-player characters. Before a non-player character is invoked in the skill-based game provided by an interactive application executing on an interactive controller, a random number generator 1050 is used to generate a random outcome having a known distribution. A set of configurations of the artificial intelligence attributes NPCi 1052 for the non-player character is determined by mapping 1054 portions of the range of the random outcome to one or more configurations of the artificial intelligence NPC attributes. An award of an amount of credits $E(A_i)$ 1056 is associated with the non-player character based on the probability that a specified set of configurations of the artificial intelligence components is determined. In an example embodiment, the probability that a particular configuration of an NPC will be determined is inversely proportional to the amount of credits that are awarded to the player upon a successful interaction with the NPC.

In some embodiments, a successful interaction with an NPC by a player includes defeating the NPC as an opponent in a skill-based virtual contest such as virtual combat or the like. In various embodiments, a successful interaction with an NPC by a player includes virtual interaction, such as a simulated social interaction, simulated business transaction, or the like.

With reference to FIGS. 9 and 10, during operation, a variable skill objective wagering system implements a stateful process or protocol in order to implement a variable skill objective wagering process utilizing an NPC. In an example embodiment, in an initial state O 1000, the skill objective wagering system generates, based on a random outcome, a skill objective in the form of an NPC that has a configuration of artificial intelligence attributes, such as configuration $NPC_i$ 1052, that is to be interacted with by one or more players, and transitions, as indicated by probabilities $P(O_1)$ 1006 and $P(O_n)$ 1008, from initial state S 1000 to one or more of skill objective states $O_1$ 1002 to $O_n$ 1004 in accordance with the generated configuration of the artificial intelligence attributes. The variable skill objective wagering system transitions, as indicated by probabilities $P(A_1)$ 1016 and $P(A_n)$ 1018, from the one or more skill objective states to the one or more achievement states $A_1$ 1010 to $A_n$ 1012 based on the variable skill objective wagering system determining that the player has achieved the skill objective of a successful interaction with the NPC in accordance with the generated configuration of artificial intelligence attributes. In many embodiments, the stateful process or protocol includes determining a commitment of an amount of credit to a wager at the initial state S 1000, and determining an award of an amount of credits for the wager while in an achievement state.

In some embodiments, the known distribution of the random outcome is a uniform distribution. In other embodiments, the known distribution of the random outcome is a normal distribution.

In various embodiments, a lookup table is used to map the random outcome to a selected set of artificial intelligence attributes of an NPC.

In many embodiments, the probability distribution of the probability of the player achieving a skill objective of successfully interacting with the NPC can be described using a cumulative distribution.

In some embodiments, an amount of credits is specified based on a gaming parameter for one or more skill objectives during a wagering session as a specified award for the one or more skill objectives. In example embodiments, gaming parameters may include, but are not limited to, an amount of credits committed in a wager, an identity of a player, an amount of time that the player has been playing a skill-based game, an amount of credits wagered over time, a location of an electronic gaming machine, etc.

In some embodiments, an amount of credits is fixed for one or more skill objectives as a specified award for the one or more skill objectives.

In some embodiments, an amount of credits for a specified award of a skill objective is specified based on a random outcome.

Figure 11:
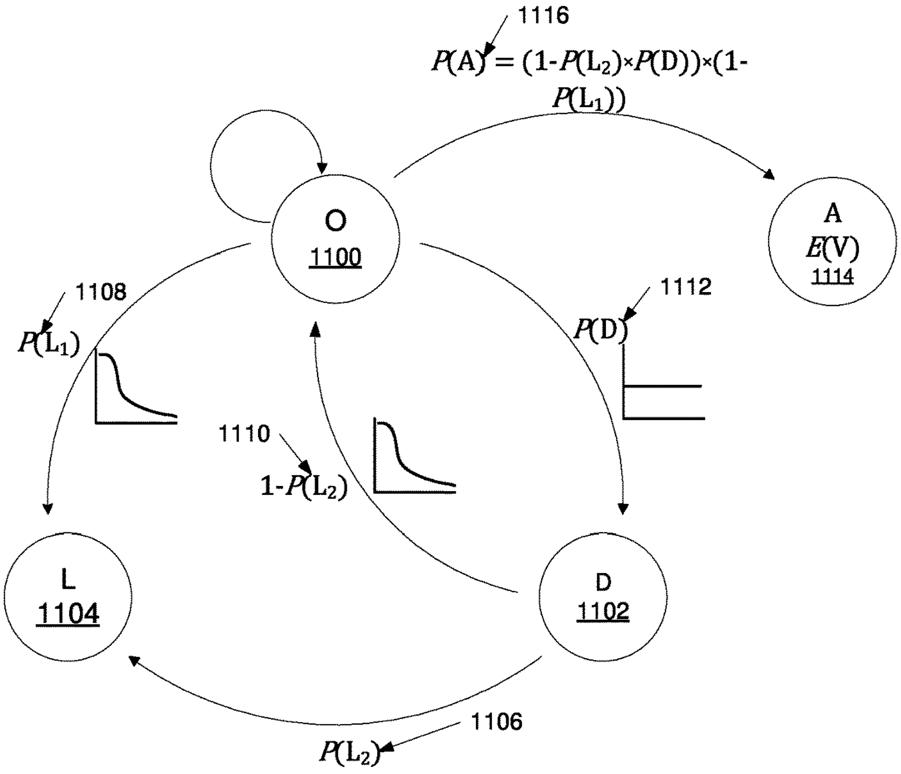
FIG. 11 is a state diagram illustrating another wagering process of a variable skill objective wagering system in accordance with various embodiments of the invention.

FIG. 11 is a state diagram illustrating another wagering process of a variable skill objective wagering system in accordance with various embodiments of the invention. In this wagering process, a player skillfully plays a skill-based game and a skill disruptor is randomly introduced into the skill-based game such that the skill disruptor lowers the probability that the player will be able to achieve a skill objective of completing the skill-based game and be awarded a specified award.

In the wagering process, the skill-based game includes a base skill objective, as indicated by base skill objective state O 1100, that the player attempts to achieve based on skillful play of a skill-based game implemented by an interactive application executing on an interactive controller. During the player's skillful play, a skill disruptor, as indicated by state D 1102, is introduced into the skill-based game by the interactive application in accordance with a random outcome having a known distribution and generated by a random number generator of a process controller. The player may fail to overcome the skill disruptor, that is the player may not be able to achieve a skill objective of overcoming the skill disruptor, leading to a loss, as indicated by state L 1104. The probability of the wagering process making such a transition from state D 1102 to state L 1104 is termed herein $P(L_2)$ 1106. In addition, the player may simply lack the skill to achieve the skill objective of completing the skill-based game, thus leading to a loss as well, as indicated by state L 1104. The probability of such a transition occurring in the wagering process from base skill objective state O 1100 to loss state L 1104 is herein termed $P(L_1)$ 1108. If the player is able to avoid losing through skillful play, then the player is awarded a specified award, as indicated by skill objective achievement state A 1114.

The probability that the player will lose because of the player's poor skillful play is $P(L_1)$ 1108 and can be determined from historical player skill metrics collected during players' skillful play of the skill-based game. Similarly, the probability that the player will lose because of the player's inability to overcome the skill disruptor, $P(L_2)$ 1106, can be determined from historical player skill metrics collected during players' skillful play of the skill-based game while attempting to overcome the skill disruptor. The probability that the skill disruptor will be introduced into the skill-based game is herein termed P(D) 1112 and is determined by a random number generator generating a random outcome to determine when to introduce the skill disruptor. The probability that the player will lose because the player is unable to overcome the skill disruptor is $P(L_2)$ 1106. The probability that the player will be able to skillfully overcome the skill disruptor, and thus cause a transition from the skill disrupter state D 1102 back to the base skill objective state O 1100, is the complement of $P(L_2)$ 1106, namely $1-P(L_2)$ 1110. The probability that the player will be able to achieve a skill objective of winning the skill-based game, thus causing a transition from base skill objective state O 1100 to skill objective achievement state A 1110, is P(A) 1116:

$$P(A)=(1-P(L_2)\times P(D))\times(1-P(L_1)),\text{ where:}$$

P(A)=probability that player will achieve a skill objective.

$P(L_1)$=probability that the player will fail to achieve the skill objective because of the player's poor skillful play of the skill-based game.

P(D)=probability that a skill disruptor will be introduced.

$P(L_2)$=probability that the player will not be able to achieve the skill objective of overcoming the skill disruptor.

The expectation value is given by:

$$E(V)=A\times(1-P(L_2)\times P(D))\times(1-P(L_1)),\text{ where:}$$

E(V)=expectation value.

A=value of specified award.

It can be seen by inspection that if the player has a low probability of losing the skill-based game because of poor skillful play, the probability that the player will be able to achieve the base skill objective, and thus be awarded the specified award, is mostly dependent upon the probability that the skill disruptor will be introduced and the probability that the player will be not be able to overcome the skill disruptor through skillful play. Furthermore, if the probability that the player will not be able to overcome the skill disruptor is unity, that is there is no way for the player to overcome the skill disruptor once the skill disruptor is introduced, the probability that the player will be able to achieve the skill objective is entirely dependent upon the probability that the skill disruptor is introduced. That is, as $P(L_1) \Rightarrow 0$ and $P(L_2) \Rightarrow 1$, then $E(V) \Rightarrow A\times(1-P(D))$, accordingly, an upper bound on a player's expectant value can be determined almost exclusively by the probability of the skill disruptor being introduced if both the probability of losing the skill-based game without the skill disruptor is low and the probability of losing the skill-based game is high when the skill disruptor is introduced.

During operation, a variable skill objective wagering system implements a stateful process or protocol in order to implement a variable skill objective wagering process having a skill disruptor. In an example embodiment, the skill objective wagering system provides a skill-based game to a player and enters a base skill objective state O 1100. While in the base skill objective state O 1100, the variable skill objective wagering system generates a skill disrupter within the skill-based game based on a random outcome during the player's skillful play of the skill-based game and transitions, as indicated by probability P(D) 1112, from the base skill objective state O 1100 to a skill disruptor state D 1102. While in the skill disruptor state D 1102, the variable skill objective wagering system determines if the player has overcome the skill disruptor through skillful play of the skill-based game. When variable skill objective wagering system determines that the player has not been able to overcome the skill disruptor, the variable skill objective wagering system transitions to a loss state L 1104 as indicated by probability $P(L_2)$ 1106.

When variable skill objective wagering system determines that the player has been able to overcome the skill disruptor, the variable skill objective wagering system transitions to base skill objective state O 1100 as indicated by probability $1-P(L_2)$ 1110. In the base skill objective state O 1100 variable skill objective wagering system determines if the player is unable to achieve a base skill objective. If the variable skill objective wagering system determines that the player has not been able to achieve the base skill objective, the variable skill objective wagering system transitions to the loss state L 1104 as indicated by probability $P(L_1)$ 1108. If the variable skill objective wagering system determines that the player has been able to achieve the base skill objective, then the variable skill objective wagering system transitions to achievement state A 1114 as indicated by probability P(A) 1116.

In many embodiments, the stateful process or protocol includes determining a commitment of an amount of credit to a wager at the base skill objective state O 1100, and determining an award of an amount of credits for the wager while in the skill objective achievement state A 1114.

In some embodiments, the known distribution of the random outcome is a uniform distribution. In other embodiments, the known distribution of the random outcome is a normal distribution.

In various embodiments, a lookup table is used to map the uniformly distributed random outcome to the introduction of the skill disruptor into the skill-based game.

In many embodiments, the probability distribution of the probability of the player achieving a base skill objective can be described using a cumulative distribution.

In some embodiments, the probability distribution of the probability of the player overcoming a skill disruptor can be described using a cumulative distribution.

In some embodiments, an amount of credits is specified based on a gaming parameter for one or more skill objectives during a wagering session as a specified award for the one or more skill objectives. In example embodiments, gaming parameters may include, but are not limited to, an amount of credits committed in a wager, an identity of a player, an amount of time that the player has been playing a skill-based game, an amount of credits wagered over time, a location of an electronic gaming machine, etc.

In some embodiments, an amount of credits is fixed for one or more skill objectives as a specified award for the one or more skill objectives.

In some embodiments, an amount of credits for a specified award of a skill objective is specified based on a random outcome.

Figure 12:
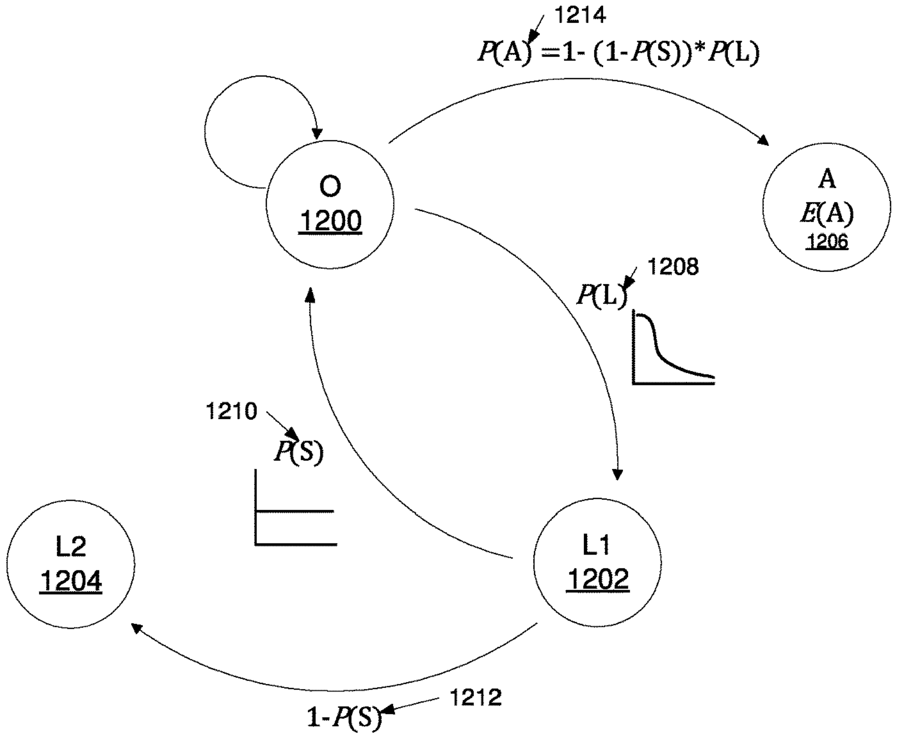
FIG. 12 is a state diagram illustrating another wagering process of a variable skill objective wagering system in accordance with various embodiments of the invention.

FIG. 12 is a state diagram illustrating another wagering process of a variable skill objective wagering system in accordance with various embodiments of the invention. In this wagering process, a player skillfully plays a skill-based game and a skill enhancer is randomly introduced into the skill-based game during the player's skillful play of the skill game such that the skill enhancer raises the probability that the player will be able to achieve a skill objective of completing the skill-based game and be awarded an amount of credits as an award.

In the wagering process, the skill-based game includes a base skill objective, as indicated by base skill objective state O 1200, that the player attempts to achieve based on skillful play of a skill-based game implemented by an interactive application executing on an interactive controller. During the player's skillful play, the player will experience an intermediate loss in the skill-based game and the wagering process will transition to initial loss state L1 1202. While in initial loss state L1 1202, the variable skill objective wagering system randomly generates a skill enhancer into the skill-based game, causing the wager process to transition back to base skill objective state O 1200. If the skill enhancer is not introduced into the skill-based game, then the wagering process transitions to a final loss state L2 1204, and the player will experience a final loss. If the player is able to avoid losing the skill-based game through skillful play, then the player is awarded a specified award, as indicated by skill objective achievement state A 1206.

The probability that the player will experience the intermediate loss because of the player's poor skillful play, herein termed P(L) 1208, causing the wagering process to transition from base skill objective state O 1200 to initial loss state L1 1202 can be determined from historical player skill metrics collected during players' skillful play of the skill-based game.

The skill enhancer is introduced into the skill-based game by the variable skill objective wagering system in accordance with a random outcome having a known distribution and generated by a random number generator of a process controller, causing the variable skill objective wagering system to transition to the base skill objective state O 1200. The probability of such a transition occurring in the wagering process from the initial state L1 1202 back to the base skill objective state O 1200 is herein termed P(S) 1210.

Similarly, the probability that the player will experience a final loss and the variable skill objective wagering system wagering process transitioning from state L1 1202 to state L2 1204 is the complement of P(S), namely 1−P(S). The probability that the player will be able to achieve a skill objective of winning the skill-based game P(A) 1214, thus causing the wagering process to transition from base skill objective state O 1200 to skill objective achievement state A 1206, is given by:

$$P(A)=(1-P(S))\times P(L)),$$ where:

P(A)=probability that player will achieve a skill objective.

P(L)=probability that the player will experience an intermediate loss because of the player's poor skillful play of the skill-based game.

P(S)=probability that a skill enhancer will be introduced.

The expectation value is given by:

$$E(V)=A\times(1-P(S))\times P(L),$$ where:

E(V)=expectation value.

A=value of specified award.

It can be seen by inspection that if the player has a high probability of experiencing an intermediate loss in the skill-based game because of poor skillful play, the probability that the player will be able to achieve the base skill objective, and thus be awarded the specified award, is mostly dependent upon the probability that the skill enhancer will be introduced by the variable skill objective wagering system. That is, as $P(L) \Longrightarrow 1$, then $E(V) \Longrightarrow A\times(1-(1-P(S))$ or simply $A\times P(S)$, that is an upper bound on a player's expectant value can be determined almost exclusively by the probability of the skill enhancer being introduced if the probability of experiencing an intermediate loss is high.

During operation, a variable skill objective wagering system implements a stateful process or protocol in order to implement a variable skill objective wagering process. In an example embodiment, the skill objective wagering system provides a skill-based game to a player and enters a base skill objective state O 1200. While playing the skill-based game, the variable skill objective wagering system may determine that the player has failed to achieve the base skill objective and the variable skill objective wagering system transitions from base skill objective state 1200 to intermediate loss state L1 1202. While in the intermediate loss state L1 1202, the variable skill objective wagering system generates a skill enhancer within the skill-based game based on a random outcome during the player's skillful play of the skill-based game and transitions, as indicated by probability P(S) 1210, from the intermediate loss state L1 1202 to the base skill objective state O 1200. If the variable skill objective wagering system determines not to generate the skill enhancer, then the variable skill objective wagering system transitions to the final loss state L2 1204, as indicated by probability 1−P(S) 1212. While in the base skill objective state O 1200, if the variable skill objective wagering system determines that the player has successfully achieved the base skill objective of the skill-based game, the variable skill objective wagering system determines transitions to the skill objective achievement state A 1206, as indicated by probability transition P(A) 1214.

In many embodiments, the stateful process or protocol includes determining a commitment of an amount of credit to a wager during the base skill objective state O 1200, and determining an award of an amount of credits for the wager while in the base skill objective achievement state A 1206.

In some embodiments, the known distribution of the random outcome is a uniform distribution. In other embodiments, the known distribution of the random outcome is a normal distribution.

In various embodiments, a lookup table is used to map the random outcome to the generation of the skill enhancer in the skill-based game.

In many embodiments, the probability distribution of the probability of the player achieving a base skill objective can be described using a cumulative distribution.

In some embodiments, an amount of credits for a specified award of a skill objective is specified based on a random outcome.

In some embodiments, an amount of credits is specified based on a gaming parameter for one or more skill objectives during a wagering session as a specified award for the one or more skill objectives. In example embodiments, gaming parameters may include, but are not limited to, an amount of credits committed in a wager, an identity of a player, an amount of time that the player has been playing a skill-based game, an amount of credits wagered over time, a location of an electronic gaming machine, etc.

In some embodiments, an amount of credits is fixed for one or more skill objectives as a specified award for the one or more skill objectives.

The wagering processes described herein may be combined in various ways to create wagering processes for various types of skill-based games. In various embodiments, an amount of credits is received from a player and the player is awarded a specified award of an amount of credits for achieving one or more skill objectives of a skill proposition where a probability that the player will be able to achieve the one or more skill objectives is inversely proportional to the specified award of an amount of credits such that the more difficult the one or more skill objectives are, the higher the specified award of an amount of credits awarded to the player. The one or more skill objectives are randomly selected using a random outcome of a random number generator. The random outcome is mapped to various parameters and rule sets of skill objectives having varying difficulties to create a skill objective of the skill proposition. Accordingly, the random outcome determines a difficulty of the one or more skill objectives but not the specified award of an amount of credits awarded to the player for achieving the one or more skill objectives and it is up to the skill of the player to achieve the one or more skill objectives of the skill proposition and be awarded the specified award of an amount of credits associated with the one or more skill objectives.

In an example embodiment, an interactive application provides a skill-based puzzle piece drop game to a player, and the player is awarded with a specified award of an amount of credits for achieving skill objectives of positioning dropped puzzle pieces composed of squares to complete rows. The squares of the puzzle pieces have a range of colors and completing a row in a single color results in an award of the specified award of an amount of credits. Whether or not a next puzzle piece will allow the player to complete a row in a particular color is determined by a random outcome used to generate a skill objective of a skill proposition. In some such embodiments, the player lines up groups of blocks in various shapes to create a completely filled row. Each time the player creates a single row of blocks that are the same color, the player is awarded a specified award of an amount of credits; each time the player creates two rows of blocks that are the same color, the player is awarded a higher specified award of an amount of credits; etc. At the start of each level, the random outcome is used to randomly determine the color, order, and shape of the blocks given to the player to create rows. Sometimes the player is provided with the shapes and colors in an order that facilitates the creation of rows. Sometimes the player is provided with shapes and colors that they can do nothing with. Sometimes a skillful player will only be able create a few individual rows of one color and they will be awarded a specified award of an amount of credits less than an amount of credits wagered by the player (thus resulting in a partial win for the player); sometimes a skillful player will be able to create multiple rows of one color and the player will be awarded an amount of credits equal to an amount of credits wagered by the player (thus allowing the player to break even); and sometimes a skillful player will be able to create a significant number of rows of one color and they will be awarded an amount of credits greater than an amount of credits wagered by the player (thus resulting in a win for the player). An unskilled player may be awarded no credits, resulting in a complete loss for the player.

In another example embodiment, a skill proposition is implemented in a first person shooter style skill-based game provided by an interactive application. The skill-based game has skill objectives in the form of opponents that are engaged by the player. Some opponents stay engaged until they are defeated. If a player achieves a skill objective by defeating an opponent, the player is awarded a specified award of an amount of credits. Other opponents run away before being defeated, resulting in no award of credits.

Whether or not the opponent stays engaged or runs away is determined by skill objective generated from a random outcome. In such an embodiment, the player is always awarded for defeating an opponent and the specified award of an amount of credits awarded for defeating the opponent is constant. In some such embodiments, each time a low level opponent is defeated, the player is awarded a low specified award of an amount of credits less than an amount of credits wagered by the player (thus resulting in a partial win for the player); each time an intermediate level opponent is defeated, the player is awarded an intermediate specified award of an amount of credits equal to an amount of credits wagered by the player (thus resulting in the player breaking even); and each time a highest level opponent is defeated, the player is awarded a highest specified award of an amount of credits greater than an amount of credits wagered by the player (thus resulting in a win for the player).

At the start of each level, the random outcome randomly determines the type of opponents that appear. There are opponents that cannot be defeated; there are opponents that will automatically defeat the player if the player shoots them, but the player doesn't know which opponent they are dealing with; on some levels, no defeatable opponents appear; etc. Sometimes a skillful player will only be able to defeat a few opponents before an opponent defeats the player and be awarded a minimal amount of credits; sometimes a skillful player will be able to defeat a few opponents and the player will be awarded an amount of credits such the player breaks even or makes a little bit more than an amount of credits wagered; and sometimes a skillful player will be able to kill a high level opponent and dozens of lower level opponents and the player will be awarded significant amount of credits. An unskilled player may get the chance to defeat the highest level opponent, but because the player isn't skillful enough to defeat the highest level opponent, the player is awarded no credits.

In an example embodiment, a pinball-style video game is provided as a skill-based game by an interactive application executed by an interactive controller. The base skill objective of the skill-based game is to strike targets, sometimes referred to as toys, in a playing table of the pinball game using a pinball directed by the player using paddles or flippers. The player wagers credits against the player's skillful play of the skill-based game. The player is awarded points for each target struck as a skill metric. When the skill metric reaches one or more specified levels, the player is awarded with corresponding one or more specified awards in amounts of credits. In some embodiments, one or more skill disruptors are introduced as described herein into the playing table of the video pinball game as skill objectives. In various embodiments, the one or more skill disruptors are in the form of one or more bumpers introduced into the playing table of the video pinball game such that the player must avoid striking the one or more bumpers in order to continue playing the pinball game. In some such embodiments, once one of the one or more bumpers are struck with a pinball, the player loses the pinball, that is the probability that a player can achieve the skill objective of overcoming the skill disruptor is 0. Accordingly, the player is prevented from achieving a base skill objective of the skill-based game of accumulating enough points in a skill metric to be awarded the specified award of an amount of credits.

In other embodiments, a skill enhancer is introduced as described herein into the video pinball game as a ball save feature. As the player plays the skill-based game of the video pinball game, the player will eventually miss striking the pinball with the flippers or paddles, thus losing the pinball as an intermediate loss. The pinball is returned to the player on the basis of a random outcome as a skill enhancer as described herein, thus enabling the player to complete the base skill objective of the skill-based game of accumulating enough points in a skill metric to be awarded the specified award of an amount of credits.

In another embodiment, a racing game is provided as a skill-based game of an interactive application of an interactive controller. A player wagers on the player's skill in overtaking non-player characters during a simulated race. During the simulated race, a player is presented with one or more skill-objectives of overtaking an opponent non-player character in the form of another racer. The characteristics of the non-player character are determined using a random outcome as described herein. If the player is able to overtake and pass the opponent non-player character, the player is awarded a specified award of an amount of credits.

In another such embodiment, the player wagers on their skill in navigating around a course by a set amount of time. As the player navigates around the course to complete the course, skill disruptors are randomly introduced as described herein into the racing game in the form of obstacles. Some obstacles cause the player to crash regardless of the skill of the player, that is the obstacles are skill disruptors having a probability of 0 that the player can skillfully achieve the skill objective of overcoming the skill disruptor. In various embodiments, a skill enhancer is randomly introduced as described herein that enables the player to complete a skill-objective, such as, but not limited to, fuel for a vehicle being raced by the player. Without the skill enhancer, the player is unable to complete a skill objective such that the player is awarded a specified award of an amount of credits.

In some embodiments, a determination of whether or not to implement a skill enhancer or a skill disruptor is based on a return to player calculated for an individual player during a wagering session. In an example embodiment, a return to player (RTP) is calculated for a player during a wagering session. The RTP is then compared to a baseline or expected RTP for the game. If the player's individual RTP during the wagering session exceeds the expected RTP by a threshold limit, then a skill disruptor is provided to the player during the wagering session to hinder the player's skillful play of the game, thereby lowering the player's individual RTP.

Conversely, if the player's individual RTP falls below the expected RTP by a threshold limit, then the a skill enhancer is introduced into the skill-based game during the player's wagering session in order to increase the player's skill performance, and hence the player's individual RTP.

In other embodiments, a determination of whether or not to implement a skill enhancer or a skill disruptor is based on a return to player calculated for a plurality of players during a plurality of wagering sessions. In an example embodiment, a return to player (RTP) is calculated for a plurality of players during a plurality of wagering sessions. The RTP is then compared to a baseline or expected RTP for the game. If the RTP for the plurality of players during the plurality of wagering sessions exceeds the expected RTP by a threshold limit, then a skill disruptor is introduced into a skill-based game during gameplay by a subsequent one or more players during their respective wagering sessions to hinder the players' skillful play of the game, thus lowering the RTP of the skill-based game. Conversely, if the plurality of players' RTP falls below the expected RTP by a threshold limit, then a skill enhancer is introduced into a skill-based game during gameplay by a subsequent one or more players during their respective wagering sessions in order to increase the player's skill performance, thus raising the RTP of the skill-based game.

In some embodiments, the skill enhancer is an additional game object or game resource, including, but not limited to, a hand grenade in a first person shooter skill-based game.

In many embodiments, a free play is provided as a skill enhancer. In an example embodiment, in an archery target shooting game, if a player misses too many shots, free arrows are awarded, giving a player another shot at a target. In this example, it's not credits that are awarded, but another tool or instrument useful in the skill-based game.

In some embodiments, a skill enhancer is a game map for a game world of a skill-based game that makes it easier for a player to achieve a skill-objective.

In some embodiments, a skill disruptor is a game map for a game world of a skill-based game that makes it harder for a player to achieve a skill-objective.

While the above description may include many specific embodiments of the invention, these should not be construed as limitations on the scope of the invention, but rather as examples of embodiments thereof. It is therefore to be understood that the invention can be practiced otherwise than specifically described, without departing from the scope and spirit of the invention. Thus, embodiments of the invention described herein should be considered in all respects as illustrative and not restrictive.

What is claimed:

1. A variable skill objective wagering electronic gaming machine, comprising:

an interactive controller constructed to:

receive a skill proposition including a base skill objective for a skill-based game from a process controller;

generate a player presentation based on the skill proposition and the base skill objective;

detect player interactions of a player with the player presentation;

determine an initial loss state as a skill outcome based on the player interactions and the base skill objective of the skill proposition;

communicate the base skill outcome of the initial loss state to the process controller;

receive a randomly generated skill-enhancer skill objective from the process controller; and determine a final loss state for the skill-enhancer skill objective; and the process controller operatively connected to the interactive controller, wherein the process controller is constructed to:

determine the base skill objective of the skill proposition;

communicate the skill proposition to the interactive controller;

receive the skill outcome for the base skill objective of the skill proposition from the interactive controller;

generate a random outcome using a random number generator;

determine the skill-enhancer skill objective using the random outcome; and communicate the skill-enhancer skill objective to the interactive controller, wherein the skill-enhancer skill objective is a skill enhancer introduced into the skill-based game during the player's skillful play of the skill-based game when the variable skill objective wagering electronic gaming machine determines that the player has experienced an initial loss of the base skill objective.

2. The variable skill objective wagering electronic gaming machine of claim 1, wherein the interactive controller and the process controller are constructed from the same device.

3. The variable skill objective wagering electronic gaming machine of claim 1, wherein the process controller is operatively connected to the interactive controller using a communication link.

4. The variable skill objective wagering electronic gaming machine of claim 1, wherein a credit processing controller and the process controller are constructed from the same device.

5. The variable skill objective wagering electronic gaming machine of claim 1, wherein a credit processing controller, the interactive controller, and the process controller are constructed from the same device.

6. The variable skill objective wagering electronic gaming machine of claim 1, further comprising:

a credit processing controller; and an enclosure constructed to mount:

a user input device operatively connected to the interactive controller;

a user output device operatively connected to the interactive controller;

a credit input device operatively connected to the credit processing controller; and a credit output device operatively connected to the credit processing controller.

7. The variable skill objective wagering electronic gaming machine of claim 6, wherein the process controller is further constructed to:

communicate with the credit input device to receive a credit input;

credit a credit meter with credits based on the incoming credit data;

update the credit meter based on the skill outcome of the wager; and communicate with the credit output device to generate a credit output based on credits transferred off of the credit meter.

8. The variable skill objective wagering electronic gaming machine of claim 1, wherein the base skill objective is a skill disruptor introduced into the skill-based game during the player's skillful play of the skill-based game.

* * * * *